United States Patent
Hart et al.

(10) Patent No.: US 9,274,744 B2
(45) Date of Patent: Mar. 1, 2016

(54) RELATIVE POSITION-INCLUSIVE DEVICE INTERFACES

(75) Inventors: Gregory M. Hart, Mercer Island, WA (US); Jeffrey P. Bezos, Greater Seattle Area, WA (US); Frances MHH Kwee, San Francisco, CA (US); James Samuel Brown, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 311 days.

(21) Appl. No.: 12/902,986

(22) Filed: Oct. 12, 2010

(65) Prior Publication Data

US 2012/0062729 A1 Mar. 15, 2012

Related U.S. Application Data

(63) Continuation-in-part of application No. 12/879,981, filed on Sep. 10, 2010.

(51) Int. Cl.
| | |
|---|---|
| *H04N 7/18* | (2006.01) |
| *G06F 3/16* | (2006.01) |
| *G06F 1/16* | (2006.01) |
| *G06F 3/01* | (2006.01) |
| *H04N 7/14* | (2006.01) |

(52) U.S. Cl.
CPC .............. *G06F 3/165* (2013.01); *G06F 1/1626* (2013.01); *G06F 1/1686* (2013.01); *G06F 3/011* (2013.01); *G06F 3/013* (2013.01); *H04N 7/142* (2013.01); *G06F 2200/1637* (2013.01); *H04M 2250/52* (2013.01)

(58) Field of Classification Search
CPC ...................................................... H04N 7/142

USPC ........................................................ 348/135
See application file for complete search history.

(56) References Cited

U.S. PATENT DOCUMENTS

| | | | |
|---|---|---|---|
| 4,866,778 | A | 9/1989 | Baker |
| 5,621,858 | A | 4/1997 | Stork et al. |
| 5,632,002 | A | 5/1997 | Hashimoto et al. |
| 5,960,394 | A | 9/1999 | Gould et al. |
| 6,185,529 | B1 | 2/2001 | Chen et al. |
| 6,594,629 | B1 | 7/2003 | Basu et al. |
| 6,728,680 | B1 | 4/2004 | Aaron et al. |
| 7,039,198 | B2 | 5/2006 | Birchfield et al. |

(Continued)

OTHER PUBLICATIONS

Van Veen, Barry D., et al., "Beamforming a Versatile Approach to Spatial Filtering," IEEE ASSP MAGAZINE, Apr. 1988.

(Continued)

*Primary Examiner* — Andy Rao
*Assistant Examiner* — Obafemi Sosanya
(74) *Attorney, Agent, or Firm* — Novak Druce Connolly Bove + Quigg LLP

(57) ABSTRACT

A computing device can analyze image or video information to determine a relative position of an active user. The computing device can optimize audio or video data capture based at least in part upon the relative location. The device can capture audio using one or more microphones pointing toward the relative location of the active user, and can use other microphones to determine audio from other sources to be removed from the captured audio. If video data is being captured, a video capture element can be adjusted to focus primarily on the active user. The position of the user can be monitored so the audio and video data capture can be adjusted accordingly.

29 Claims, 16 Drawing Sheets

(56) References Cited

U.S. PATENT DOCUMENTS

| | | |
|---|---|---|
| 7,082,393 B2 | 7/2006 | Lahr |
| 7,587,053 B1 | 9/2009 | Pereira |
| 7,613,310 B2 | 11/2009 | Mao |
| 7,760,248 B2 | 7/2010 | Marks et al. |
| 7,761,302 B2 | 7/2010 | Woodcock et al. |
| 8,150,063 B2 | 4/2012 | Chen et al. |
| 8,296,151 B2 | 10/2012 | Klein et al. |
| 8,892,446 B2 | 11/2014 | Cheyer et al. |
| 2002/0194005 A1 | 12/2002 | Lahr |
| 2003/0083872 A1 | 5/2003 | Kikinis |
| 2003/0171921 A1 | 9/2003 | Manabe et al. |
| 2004/0122666 A1 | 6/2004 | Ahlenius |
| 2004/0205482 A1 | 10/2004 | Basu et al. |
| 2005/0064912 A1* | 3/2005 | Yang ................... G08B 6/00 455/567 |
| 2006/0143006 A1 | 6/2006 | Asano |
| 2007/0025555 A1* | 2/2007 | Gonai et al. ................ 381/17 |
| 2008/0064437 A1* | 3/2008 | Chambers .......... H04N 1/00307 455/556.1 |
| 2008/0262849 A1* | 10/2008 | Buck ................... G10L 15/28 704/275 |
| 2010/0063880 A1 | 3/2010 | Atsmon et al. |
| 2010/0082341 A1 | 4/2010 | Kim |
| 2010/0092007 A1 | 4/2010 | Sun |
| 2010/0179811 A1 | 7/2010 | Gupta et al. |
| 2010/0208914 A1 | 8/2010 | Ohtsuka |
| 2010/0233996 A1* | 9/2010 | Herz ..................... H04L 63/08 455/411 |
| 2010/0241431 A1 | 9/2010 | Weng et al. |
| 2010/0280983 A1 | 11/2010 | Cho et al. |
| 2011/0032845 A1 | 2/2011 | Agapi et al. |
| 2011/0164105 A1* | 7/2011 | Lee ....................... H04N 7/142 348/14.02 |
| 2011/0184735 A1 | 7/2011 | Flaks et al. |
| 2011/0270609 A1 | 11/2011 | Jones et al. |
| 2011/0279483 A1* | 11/2011 | Ek ................................ 345/690 |
| 2011/0285807 A1 | 11/2011 | Feng |

OTHER PUBLICATIONS

"Final Office Action dated Feb. 26, 2013", U.S. Appl. No. 12/879,981, Feb. 26, 2013, 29 pages.

"Non Final Office Action dated Nov. 13, 2012", U.S. Appl. No. 12/879,981, Nov. 13, 2012, 26 pages.

"Notice of Allowance dated May 13, 2013", U.S. Appl. No. 12/879,981, May 13, 2013, 9 pages.

Valin, Jean-Marc et al., "Robust Sound Source Localization Using a Microphone Array on a Mobile Robot", Research Laboratory on Mobile Robotics and Intelligent Systems; Department of Electrical Engineering and Computer Engineering; Universite de Sherbrooke, Quebec, Canada, 6 pages.

* cited by examiner

RELATIVE POSITION-INCLUSIVE DEVICE INTERFACES

This application is a Continuation-in-Part of, and claims priority to, U.S. patent application Ser. No. 12/879,981, filed Sep. 10, 2010, entitled "Speech-Inclusive Device Interfaces," which is hereby incorporated herein for all purposes.

BACKGROUND

As the variety of available computing devices increases, and as the size of many of these devices decreases, people are increasingly utilizing portable devices such as cellular phones, personal digital assistants (PDAs) and other electronic devices to perform an ever-increasing variety of tasks. Accordingly, there comes a need to adapt the ways in which users interface with these computing devices to perform these tasks. For example, some devices can receive commands to perform an action (e.g., "call home") by voice or audio input, but the accuracy of such input can vary based upon factors such as background noise and the number and strength of sources generating detectable audio, as well as the proximity and locations of those sources relative to the person providing the command. While some devices use a directional microphone to capture audio primarily from a user or specific source, such an approach is not optimal when there are multiple sources of input in different locations, or the source of interest moves over time. Further, while some devices might use a noise canceling algorithm to reduce unwanted ambient sounds, these algorithms do not account for audio or sound from locations around the device that can appear or change at any given time.

BRIEF DESCRIPTION OF THE DRAWINGS

Various embodiments in accordance with the present disclosure will be described with reference to the drawings, in which.

DETAILED DESCRIPTION

Figure 1:
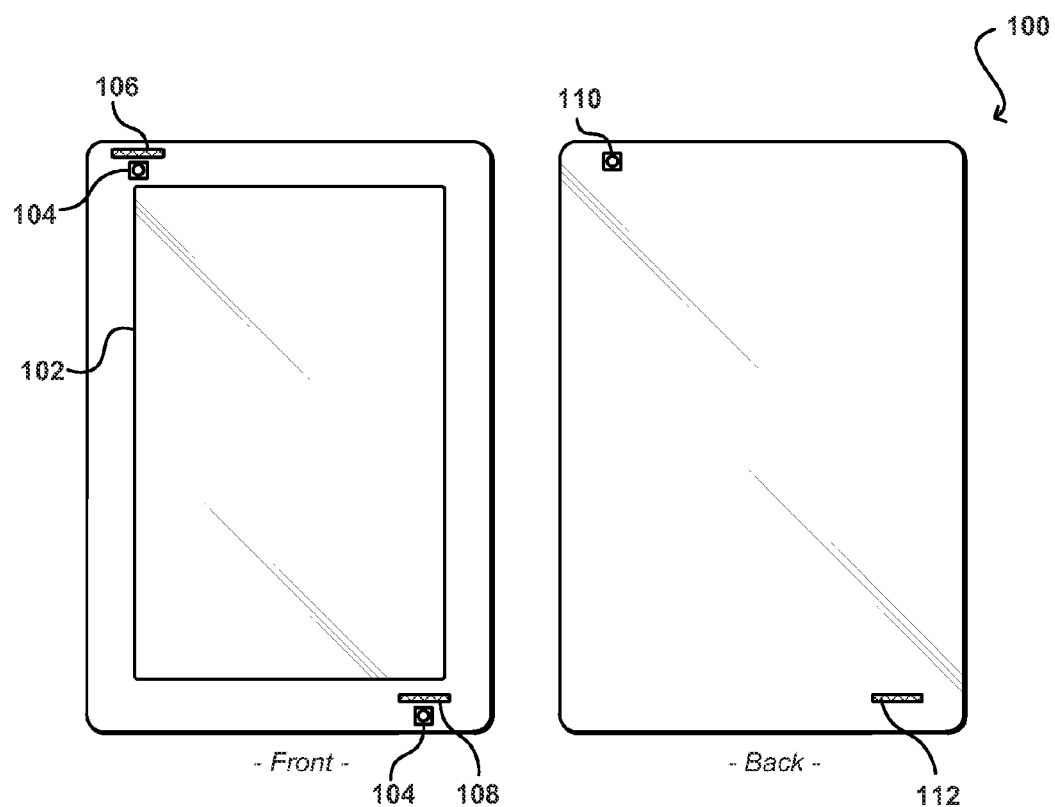
FIG. 1 illustrates front and back views of an example of a computing device including elements operable to capture audio and video information that can be used in accordance with various embodiments.

Systems and methods in accordance with various embodiments of the present disclosure may overcome one or more of the aforementioned and other deficiencies experienced in conventional approaches to controlling or otherwise providing input to, or output from, a system, device, interface or other such object or element in an electronic environment. Systems and methods in accordance with various embodiments can identify one or more active users or other sources at any given time, and can determine a relative position of each of those active users or sources with respect to at least one computing device. Based at least in part upon the determined relative position, the computing device(s) can optimize audio, video, and/or other types of data capture or data transmission.

In some embodiments, a computing device includes at least two image capture elements for concurrently/simultaneously capturing image data (e.g., images or video) in some or all directions around the device and triangulating a relative position of at least one audio source (e.g., a user). One or more image recognition or analysis algorithms can analyze the captured image data to detect certain events, such as: a movement, action, or gesture of a user; a relative distance to that user; or a facial recognition of a user, which can cause that user (or another source of such events) to be determined an "active user" or otherwise designated as a present source of audio data for optimization. A computing device also can include at least three audio capture elements that can be configured to capture audio data primarily from the active user.

In response to designating a user (or other source) as an active user (or active source), the computing device can attempt to determine a relative position (or other relative location) of the active user with respect to the device. In some embodiments, the device will use image analysis to attempt to determine the relative position of the active user, while other approaches can additionally be used to improve such determinations, as may include time-of-flight distance determinations, focal length adjustments, or other such approaches.

Once a relative position if an active user is determined, the device can adjust at least one of image, audio, video, and/or data transmission and/or capture based at least in part upon the relative position of that active user. For example, if the device has one microphone facing more toward the active user and one microphone facing more away from the active user, the device can capture audio only from the microphone facing more towards the active user, or can use audio data captured by the microphone facing more away from the active user to remove background noise and/or audio detected by the microphone from other sources. If multiple microphones are available, the device can use any of a number of algorithms to optimize the clarity of the audio captured from the relative position. In one example embodiment, a user of the device can walk into a noisy environment (e.g., a bar), place the device on a surface (e.g., a table) and the device would identify (and track) the location of the user and capture the user's voice and remove the audio signals emitted from other locations (noise). Similarly, if the user was humming rather than speaking, the device can capture the humming sounds from the location of the user and remove the noise sources emitted from other locations. If there are multiple active users, similar approaches can be used to optimize audio capture from the relative position of each active user, while minimizing audio interference from other directions using standard digital signal processing (e.g., ignore audio signals from other positions to cancel the noise signals from other audio sources). Similar approaches can be used in reverse to project audio from the device primarily toward a particular relative location using one or more audio output elements (e.g., speakers) of the device.

Similar approaches can be used for video capture and/or transmission. For example, once a user is designated as an active user (e.g., closest mouth to the device) and the relative location is determined, at least one image capture element of a computing device can be adjusted to focus or otherwise be directed primarily towards the active user. If there are multiple active users, multiple images can be captured concurrently, or at least one image capture element can be adjusted to capture multiple active users concurrently.

The relative position of an active user can also be tracked by the device. For example, once a user is identified as an active user, a device can monitor the current location of a feature of the user, such as the user's eyes or mouth, and can adjust the determined relative location accordingly. Thus, if the user moves or the device is moved such that the relative position between the user and the device is altered, the device can adjust the audio capture elements accordingly, such as to capture audio data from the user at the new relative position. In one embodiment, this is accomplished using a microphone array.

In some cases, a user can be designated as an active user without performing a specified action. For example, if a user is closest to the device or centered with respect to a particular capture element, that user can be designated as the active user. In other embodiments, a computing device (or at least an element of that device) can be pointed towards a particular user, which can cause that user to be determined to be the active user as long as that user with in a defined area with respect to an element of the device.

In some cases, the device can continue to capture audio and/or video as long as the user is active, regardless of whether the user is still performing the gesture. For example, a user flagged as an active user by performing a gesture might not need to continue performing that gesture, but might remain active until another event occurs. Thus, a user flagged as active by moving his or her mouth might still have audio captured even if the user is just humming or tapping a finger, without continuing to move the user's mouth.

In some embodiments, a computing device can be configured to always treat the primary (or currently logged in, etc.) user as an active user. Thus, any time the device detects the user through visual or audio recognition, or another approach such as biometrics, the device can attempt to capture audio and/or video data primarily from a current relative position of the user. Thus, if a user sets the device down on a table, places the device on a charger, or otherwise causes the device to be in any random orientation, the device can still track the position of the user and adjust data capture accordingly. Similarly, if the user walks around the room, sits down, stands up, or performs any similar motion, the device can still track the user and capture the audio data from the user at the new positions. An advantage to such an approach is that a user does not have to turn on or physically interact with a device in order to provide voice or audio input. The device in some embodiments can go into a "passive monitoring" or similar mode where the display and other elements might be turned off or in a low power mode, but the device will still attempt to capture image information, even if that information is of a lower quality or resolution than during normal operation. For example, the device might have a low resolution or black and white image capture mode that requires fewer processing resources, and this mode can monitor movement around the device when there is no active user, the device is not currently being utilized, or at any other appropriate time. When the device detects an active user from the lower quality capture mode, the device can power up certain functionality, switch to a higher resolution capture mode, attempt to track the position of the user and optimize any data capture from that relative position, etc.

In some embodiments, a device might not have a sufficient number of elements in an orientation necessary to perform a function such as triangulation, distance determination, etc. If, however, there are two or more devices that each have one element facing in an appropriate direction, and those devices are able to communicate, the data from the devices can potentially be aggregated to determine the desired information. For example, each of two devices can image the position of an object. If those devices can determine their relative orientation to each other, such as through use of GPS and/or electronic compass data, the image information from each can be analyzed to determine the relative position of the object with respect to each device. Similarly, if each device only has one speaker facing towards the user, either of the devices alone might not be able to sufficiently target the position of a user for sound projection, but the combination of speakers might be able to provide sufficient directionality and distance functions.

In some embodiments, a device can be configured to capture audio and/or video data from certain sources, while ignoring or filtering out data from other sources. For example, in a meeting or classroom situation the device might be configured to treat each person as an active user, at least when that person is speaking, and treat every other sound source as a source to be filtered out. The device can continually monitor sound quality, as well as sound received from various directions around the device, to adjust filtering, directionality, and other such aspects.

In some embodiments, the device might have elements that are capable of moving or rotating to provide directionality. For example, an image capture element might include components such as a moving camera, adjustable mirror or lens, rotating gimbal, or other such element to increase the field of view and/or enable image data to be captured from a specific direction and/or distance. Similar components can be provided for a unidirectional microphone and/or speaker, in order to capture or project sound from any particular direction using a small number of elements. Any other data input or output that can be adjusted based upon a current relative position of an active user, such as a coded infra-red (IR signal or a heat signature detection, can utilize moving components as well for similar and/or additional such purposes.

Various other applications, processes and uses are presented below with respect to the various embodiments.

FIG. 1 illustrates front and back views of an example computing device 100 that can be used in accordance with various embodiments. Although a portable computing device (e.g., a smart phone, an electronic book reader or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles, television set top boxes and portable media players, among others. In this example, the computing device 100 has a display screen 102, which under normal operation will display information to a user facing the display screen (e.g., on the same side of the computing device as the display screen). The computing device in this example includes at least three image capture elements, including two image capture elements 104 on the front of the device and at least one image capture element 110 on the back of the device, although it should be understood that image capture elements could also, or alternatively, be placed on the sides or corners of the device, and that there can be any appropriate number of capture elements of similar or different types. Each image capture element 104 may be, for example, a camera, a charge-coupled device (CCD), a motion detection sensor or an infrared sensor, among many other possibilities. The computing device also includes at least two microphones or other audio capture elements capable of capturing audio data, such as words spoken by a user of the device, music being hummed by a person near the device, or audio being generated by a nearby speaker or other such component. In this example there are three microphones, one microphone 108 on the front side, one microphone 112 on the back, and one microphone 106 on or near a top or side of the device. In some devices, there can be at least one microphone on each side and/or corner of the device, as well as in other appropriate locations. It also can be seen that the image capture elements and microphones on the front and back sides of the device are offset towards opposing edges of the device for triangulation or similar purposes as will be discussed later herein.

As illustrated in this example, the microphones can be placed in various locations about the device such that at least one of the microphones will typically be better able to capture audio emitted by a source in a specific direction and/or location relative to the device. In at least some embodiments, at least one microphone can be a directional microphone that captures sound information from substantially directly in front of the device, or at least directly in front of the side on which the microphone is placed, and picks up only a limited amount of sound from other directions, which can help to better capture audio from a particular direction. In other embodiments, at least one microphone can be articulated to capture sound from different directions at different times, or can have multiple elements that each can capture sound primarily from a different direction, such that the microphone can capture sound primarily from a particular direction by capturing sound using a single element or dynamically adjusting a weighting of each element. Various other approaches for capturing sound from various directions can be used as well within the scope of the various embodiments.

In at least some embodiments, a computing device includes a plurality of audio capture elements configured in an array to function as a beamformer (not shown). As known to those skilled in the art, a beamformer captures the audio output from a source at a determined location as well as from a moving source. Utilizing the location information, the beamformer can also reduce or eliminate audio signals from sources other than that user, for example an alternate noise source. More specifically and in one example embodiment, the device uses audio capture elements configured in an audio capture element array or beamformer to obtain audio from one or more users at the determined location (e.g., from where the audio is originating).

In another example embodiment, a computing device includes additional audio capture elements (not shown) arranged in the audio capture element array allowing for electronic focusing, or steering, of the audio capture element array to more precisely determine the position of the active user. More specifically and as known by those skilled in the art, the audio capture element array may be steered to generate more accurate spatial/location information of the audio signal emitted from the user. In addition to utilizing the audio capture element array, one or more Kalman filters may be used, in other example embodiments, to optimize or minimize errors of signals. By integrating a Kalman filter into the array, a least means squared focus analysis can be used to optimize the audio capture element array in terms of delays. As known to those skilled in the art, this focuses the receive directionality of the array to most effectively receive audio signals originating in a particular direction (e.g., from the active user) and can ignore or filter signals from other sources (e.g., noise, other audio sources).

Device 100 can utilize outputs from at least one of the image capture elements 104 and 110 to assist in determining the approximate direction, distance, or relative position of a source of audio information that is of interest to the device, an application executing on the device, a user of the device, etc. For example, if the user sets the device on a table and the user is standing to the right of the device, the captured image information can be analyzed to determine the approximate direction and/or location of the user, and can direct one or more microphones (or an audio capture algorithm in communication with the microphones) to capture audio information from primarily that relative position. In at least some embodiments, the device also can use audio information captured from other directions to filter out background noise or other audio information originating from other directions, which enables the device to better capture and/or differentiate audio input that corresponds to input from the active user.

Figure 2:
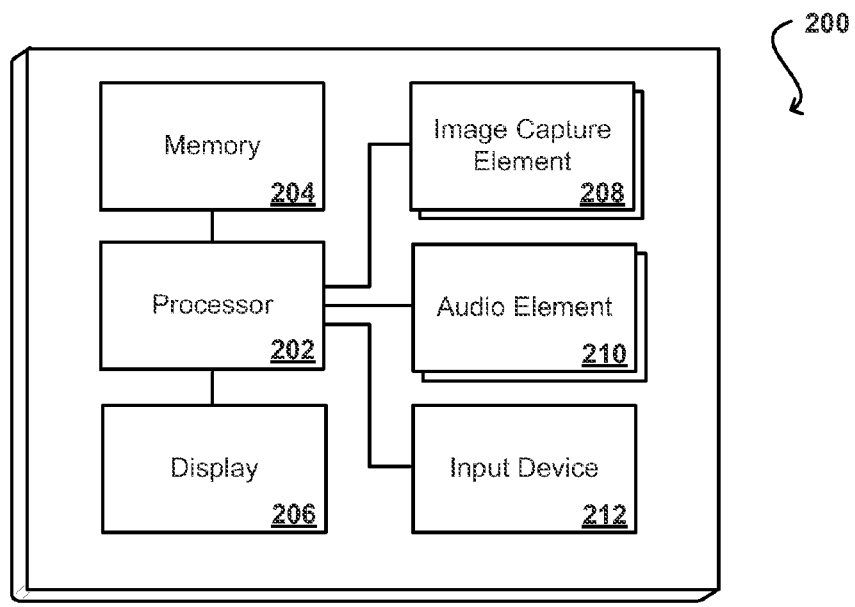
FIG. 2 illustrates example components of a computing device such as that illustrated in FIG. 1.

FIG. 2 illustrates a set of basic components of a computing device 200 such as the device 100 described with respect to FIG. 1. In this example, the device includes at least one processor 202 for executing instructions that can be stored in a memory device or element 204. As would be apparent to one of ordinary skill in the art, the device can include many types of memory, data storage or computer-readable media, such as a first data storage for program instructions for execution by the processor 202, a separate storage for images or data, a removable memory for sharing information with other devices, etc. The device typically will include some type of display element 206, such as a touch screen, electronic ink (e-ink), organic light emitting diode (OLED) or liquid crystal display (LCD), although devices such as portable media players might convey information via other means, such as through audio speakers. As discussed, the device in many embodiments will include at least two image capture elements 208, such as at least two cameras that are able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, an application or retrying to determine an audio input or other device. The device may also include the ability to retry to determine a user input.

As discussed previously, the device also can include at least three audio elements 210, which can include audio input, audio output, and audio input/output combination elements, such as a microphone or speaker embedded in, or external to, the computing device. An audio capture element can be any appropriate element, such as a dynamic, condenser, capacitor or piezoelectric. In one embodiment, each microphone has a non-symmetrical directivity pattern and is configured to have a unique sound gathering profile (e.g., non-parallel). An audio emission element can be any appropriate element, such as a speaker that is substantially uni-directional or omni-directional in nature. As discussed, the microphones and/or speakers can be positioned about the device to provide for directionality of input and/or output, based on approaches such as triangulation. In some embodiments, the device can include at least one additional input device 212 able to receive conventional input from a user. This conventional input can include, for example, a push button, touch pad, touch screen, wheel, joystick, keyboard, mouse, trackball, keypad or any other such device or element whereby a user can input a command to the device. In some embodiments, however, such a device might not include any buttons at all and might be controlled only through a combination of visual and audio commands such that a user can control the device without having to be in contact with the device.

Figure 3A:
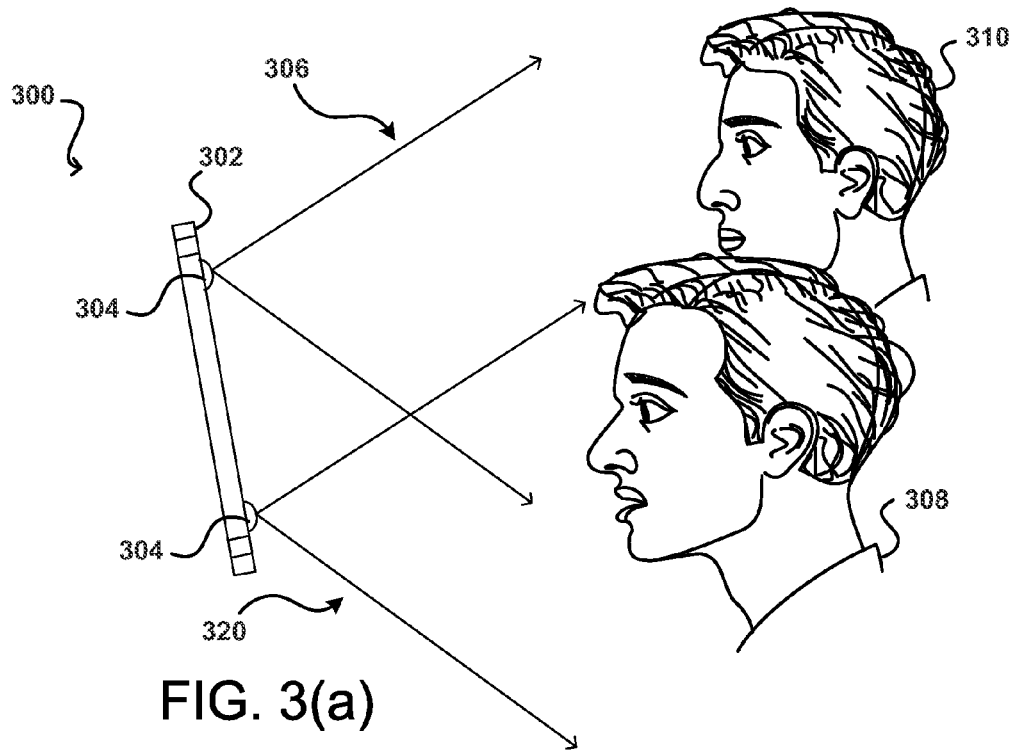
FIGS. 3(a), 3(b), 3(c) and 3(d) illustrate examples of a computing device capturing image information and/or audio information corresponding to at least one source in accordance with various embodiments.

FIG. 3(a) illustrates an example configuration 300 in which there are two people 308 and 310 within proximity of a computing device 302. In this example, either person can provide audio input to the device in accordance with one embodiment. In this configuration, image capture elements 304 are positioned on the same general side of the computing device 302 as the people, such that the device 302 can determine the respective position for each person 308 and 310, when the people are within the viewable area or viewable range 306, 320 of the image capture elements 304. While in some embodiments each image capture element 304 is fixed relative to the device, in other embodiments each image capture element can be operable to track the position of either person, such as by rotating the image capture element or an optical element (e.g., lens, mirror) that directs light to the image capture element. The image information captured by the image capture element can be analyzed, using any appropriate image analysis algorithm, to determine any of a number of actions or movements performed by either person. In this example, a first person 308 is closer to the device, which can be indicative of a primary user. After determining that the first person 308 is the primary user and the second person 310 is not the primary user, the computing device 302 can determine that an optimal approach to obtaining audio input would be to cause one or more microphones of the computing device to capture audio primarily from the relative position of the first person 308. As will be discussed in more detail elsewhere herein, this can include recording sound from a particular direction/location and/or filtering out (or removing) sound captured by a microphone recording sound from a particular direction but emitted from directions other than the relative position of the first person 308.

If the device includes software and/or hardware that is able to locate at least one feature of the user that can be consistently determined, such as the eyes, nose or mouth of the user, then the device can analyze the image information to determine relative motion over a period of time and utilize that relative motion as input. For example, if the device can determine the location of the user's mouth in the captured images, the device can monitor the relative position of that user such that if the user moves while talking, the device can update the determination of the user's position and adjust audio capture accordingly. Further, if the device is able to make such a determination for multiple people, the device can adjust the direction and/or location of audio capture based on the current person moving his or her mouth, or performing another such motion.

In some embodiments, the computing device might include one or more image recognition and analysis algorithms to determine specific actions, such as mouth movements, facial expressions, or gestures. Upon detecting such movements, as may be determined by comparing to one or more motion models, the computing device can cause audio to be detected and/or projected in at least one particular direction corresponding to the detected motion. In some embodiments, the device might continue to capture sound from the direction of a user whether or not that user continues to make the motion, such as when a user pauses talking. In other embodiments, the device might capture from the direction in which a person is currently talking, and may switch between various user positions based at least partially thereon. In some embodiments, the device might also include at least one image recognition algorithm such that the device only captures audio in the direction of a person that is recognized by the device. This could include a person who was previously known to the device, or a person from whom the device was authorized to capture audio information. Various other such algorithms can be used to make direction determinations as well within the scope of the various embodiments.

In some embodiments, a computing device 302 can determine and track an approximate area or region of interest corresponding to the user's mouth, or another such feature, in the captured images such that an algorithm of the computing device only has to analyze image data corresponding to that region, which can significantly reduce the amount of processing needed for images, particularly for high resolution, full color images. In other embodiments, in addition to canceling captured audio data emitted from locations other than that of the user, the device can track information such as the general location and position of at least one aspect of the user, such as the user's eyes, whereby a movement or gesture on the part of the user can also be detected and/or determined.

For example, a user can tilt the device or rotate the user's head, such as to nod up and down, in a "yes" motion. Such motion can be detected and analyzed by the image capture element (e.g., a camera) 304, as the position of the user's eyes in the viewable area will move in the images. Further, aspects such as the imaged shape, size and separation of the user's eyes also can change. Movement of the eyes in the viewable area could also be accomplished by moving the device up and down while the user remains still, as well as through other such motions. In some embodiments, device 302 is able to distinguish between movement of the user and movement of the device, such as by detecting movement of a background or other aspect of the images, by analyzing the separation, shape or size of various features or using movement sensing elements such as an accelerometer. Thus, in embodiments described herein that use the image capture element 304 to determine an orientation or location of the device relative to its user, a user can have an option of inputting a given type of motion which corresponds to a specific command by moving the device, altering an aspect of the user or both. Further, the direction of audio capture can be adjusted based at least upon the determined action, such as a tilting of the device as measured by an accelerometer or gyroscope, to improve upon the precision of the image analysis.

Figure 3B:
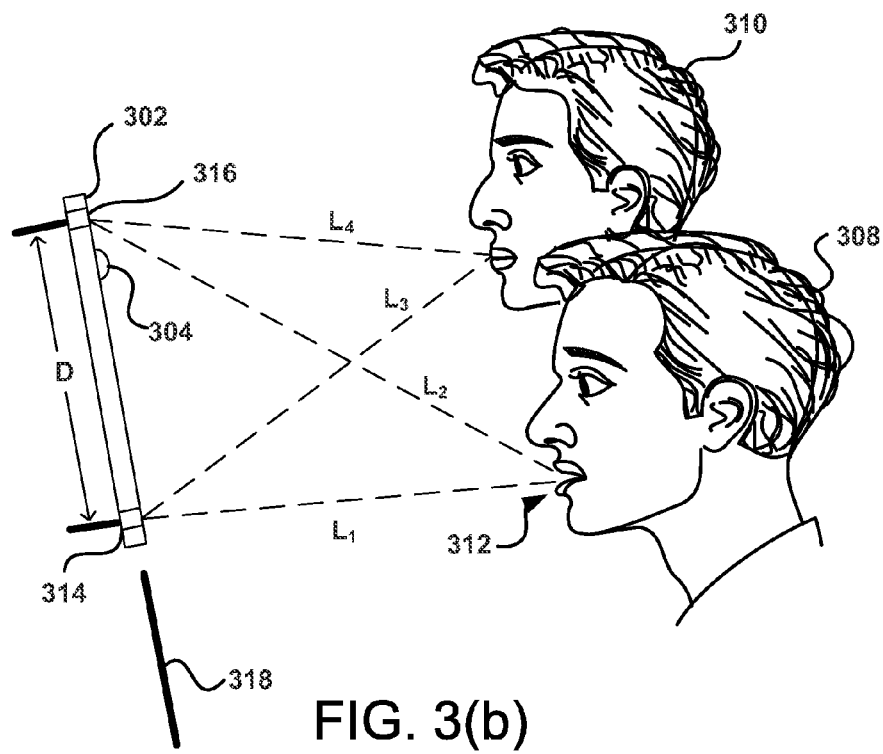

FIG. 3(b) illustrates that the example computing device 302 utilizes at least two audio capture elements 314 and 316 to capture audio from a location of one or both of the nearby persons 308 and 310. In one example embodiment, the computing device 302 analyzes the image information from the at least one image capture element 304 facing those users 310, 308 to identify a location or spatial positioning (e.g., a distance and/or orientation) of the active user 308 (e.g., person speaking) relative to the device 302. In this example embodiment, device 302 includes at least two audio capture elements configured in an array to function as a beamformer (not shown). As known to those skilled in the art, a beamformer captures the audio output in a determined direction. Utilizing the identified location information of the first person 308, the beamformer can also reduce or eliminate audio signals from sources other than that person 308, for example audio generated by the second person 310. More specifically and in one example embodiment, device 302 uses a primary audio capture element 314 and a plurality of secondary audio capture elements 316 in the audio capture element array or beamformer. Audio capture elements 314 and 316 function to obtain audio from one or more users, and in some embodiments can help to determine from where the audio is originating. In one example embodiment, audio capture elements 314 and 316 are arranged in an array pattern where the elements 314, 316 are separated by a defined distance, D, along a single plane 318. When audio is emitted from the first person 308, audio capture elements 314 and 316 each receive the audio from that person 308. The audio signal transmitted from the person 308 travels along path L1 extending from identified location of first user 308 (e.g. from mouth 312 of the first user) to audio capture element 314 and along path L2 extending from identified location of first user 308 (e.g. from mouth 312 of the first user) to audio capture element 316. Knowing distance D and that the speed of sound is roughly 343 m/s, audio capture elements 314 and 316 are configured to receive audio signals only from first user 308 (e.g., mouth 312) and filter or cancel other audio signals. Similarly, if person 310 would speak, an audio signal transmitted from person 310 would travel along path L3 to audio capture element 314 and along path L4 to audio capture element 316. In some embodiments, audio capture elements 314 and 316 may also improve the ability of device 302 to determine the location or spatial positioning of the first person 308. For example, if device 302 is angled with respect to person 308 such that audio capture element 316 is 10 cm farther from person 308 than audio capture element 314, the audio signal emitted from person 308 will be received by audio capture element 316 will be delayed in time by approximately 0.29 millisecond.

In another example embodiment, device 302 includes additional audio capture elements (not shown) arranged in the audio capture element array allowing for electronic focusing, or steering, of the audio capture element array to more precisely capture audio from the position of person 308. More specifically and as known by those skilled in the art, the audio capture element array may be steered to generate more accurate spatial/location information of the audio signal emitted from the user. In addition to utilizing the audio capture element array, one or more Kalman filters may be used, in other example embodiments, to optimize or minimize errors of signals. By integrating a Kalman filter into the array, a least means squared focus analysis can be used to optimize the audio capture element array in terms of delays. As known to those skilled in the art, this focuses the receive directionality of the array to most effectively receive audio signals originating in a particular direction (e.g., from person 308) and can ignore or filter signals from other sources (e.g., noise, other audio sources).

Figure 3C:
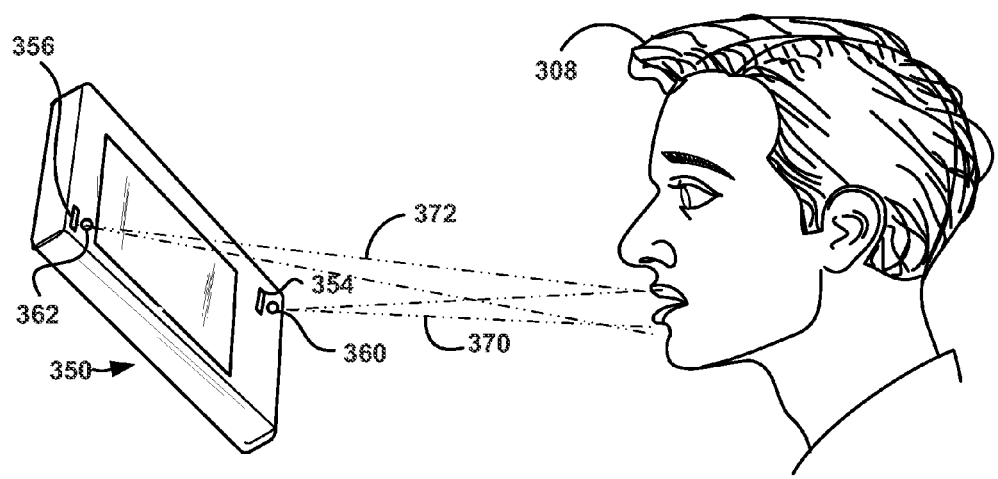

In one embodiment, location information is used to direct sound from speakers (not shown) of the device to the user. For example and as shown in FIG. 3(c), if the audio signal of person 308 is being emitted from a position that is down 20 degrees and 15 degrees to the right (with respect to a known position on device 350), audio signals from the speakers could be directed or focused on this location to limit the ability of others to hear the signal intended for the user as well as improve the user's ability to hear the signal.

Device 350, in one embodiment, may also analyze the outputs of elements 354, 356, 360 and 362 to determine a relative location (e.g., a distance and/or orientation) of user 308 relative to device 350 to identify at least one of the proper audio capture element (e.g., microphone) 354, 356 and/or image capture element 360, 362 to use to assist in determining the audio content/user input. For example as shown in FIG. 3(c), path 370 between element 354 and user 308 is shorter than path 372 between element 356 and user 308 such that the outputs of elements 354 and 360 may produce outputs greater than or equal to the outputs of elements 356 and 362. In additional embodiments, device 350 may include other distance determining elements (not shown) to determine a relative distance between one or more of elements 354, 356, 360 and 362 and the user to select the appropriate audio capture element and image capture element. Known distance determining elements include ultrasonic, laser and other know distance measuring elements. In further embodiments, device 350 may also utilize the outputs from audio and image capture elements 354, 356, 360 and 362 to alter at least one of a gain of the audio captured from at least one audio capture element 354, 356 and at least one of an image characteristic of the output from the image capture element 360, 362 including, for example, an amount of zoom, brightness, contrast and other visual characteristics of the image output. In some embodiments, device 350 may disable or turn off unselected capture elements to reduce power consumption. In other embodiments, the outputs of each type of capture element (e.g., all audio capture elements) having an output meeting or exceeding a threshold level can be combined to improve the accuracy of the speech content/user input.

Figure 3D:
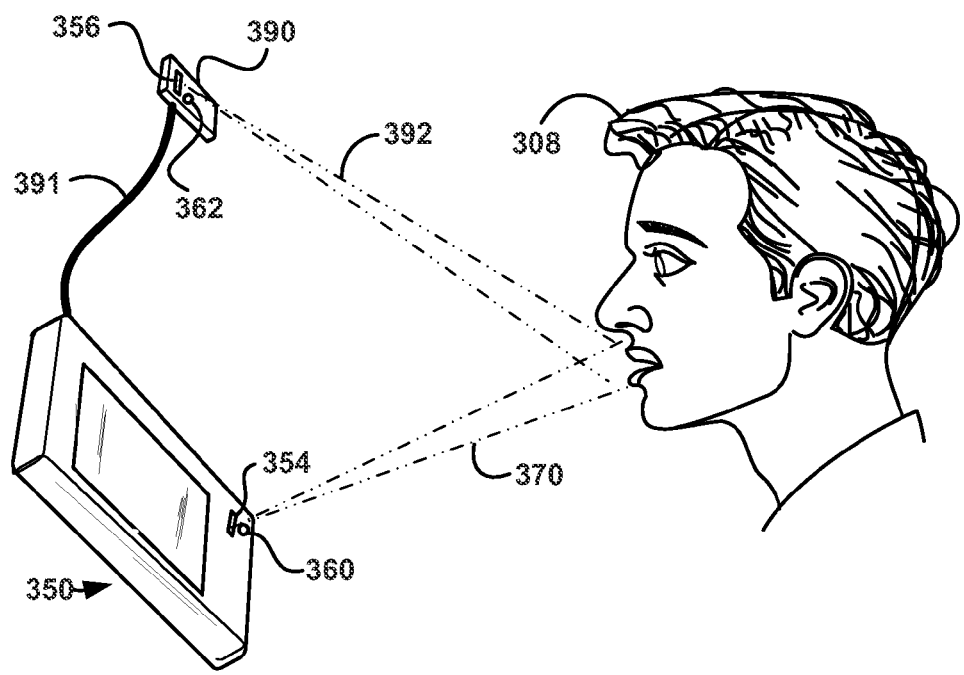

In one embodiment as illustrated in FIG. 3(d), device 350 communicates with at least one image capture element that is remote or separated from device 350. Utilizing at least one remote image capture element in conjunction with an image capture element on the device 350 (e.g., image capture element 362 in FIG. 3(d)) can improve the ability and accuracy of device 350 to determine the relative position of a user 308 or active audio source. In one embodiment, the larger distance between the image capture elements improves the accuracy of the triangulation and position determination of device 350. In the example illustrated in FIG. 3(d), remote image capture element 362 and audio capture element 356 are housed in a secondary device 390 that is in communication with device 350 via cable 391. The secondary device can, for example, be configured to be housed within or attach to device 350 (e.g., fit within, magnetically attached, etc.) when not in operation. During operation, the secondary device can be detached from the device 350 separated (even though may be connected to the device 350 via cable 391) and placed at a remote location from device 350. Remote image capture element captures image data (e.g., from path 392) and communicates this data to device 350 via a communication path (e.g., a tethered cable, wireless, RF, infra-red or other communications link). Device 350 can also utilize image data captured from any remote image capture element (e.g., remote camera, cell phone, webcam, etc.) having a defined location with respect to the device. In one embodiment, where device 350 and remote image capture element are at defined locations, device 350 can utilize the location of the widely separated image capture elements to determine the location of an active user 308 or audio source. The defined location information can be determined by each device having at least one of a GPS location, a defined coordinate, a measured coordinate (e.g., tethered cable is a defined length) as well as other methods of those skilled in the art.

In some embodiments, a device might utilize as few as two or three microphones to provide the ability to capture audio primarily from a relative location as determined by one or more image capture elements. For example, FIG. 4(*a*) illustrates an example situation 400 wherein there are two users 402 and 404 on opposing sides of a computing device 406. In this example, the device 406 has a microphone 412 on a first side of the device and another microphone 414 on the other side of the device, with microphone 412 facing user 402 and microphone 414 facing user 404. The computing device has at least one camera 408, 409, 410, enabling the device to utilize image data captured by those cameras to determine the relative direction/location from which one of the users is currently speaking, or is otherwise determined to be active. As discussed above, if the device is able to determine which user is active based at least in part upon the captured image information, the device can selectively capture audio based upon the determined relative position of that active user. For example, if the device determines that user 404 is speaking based upon the image information captured from the image capture elements 409 and 410, the device can capture audio data using microphone 414 positioned on the side of the device facing user 404, coming at the device from direction range A. In some embodiments, the device can also utilize information captured by the microphone 412 facing away from user 404 to filter out other noise (from direction range B) as known in the art, as a major difference between the audio signals captured by microphones 412 and 414 will be the audio from user 404.

Figure 4A:
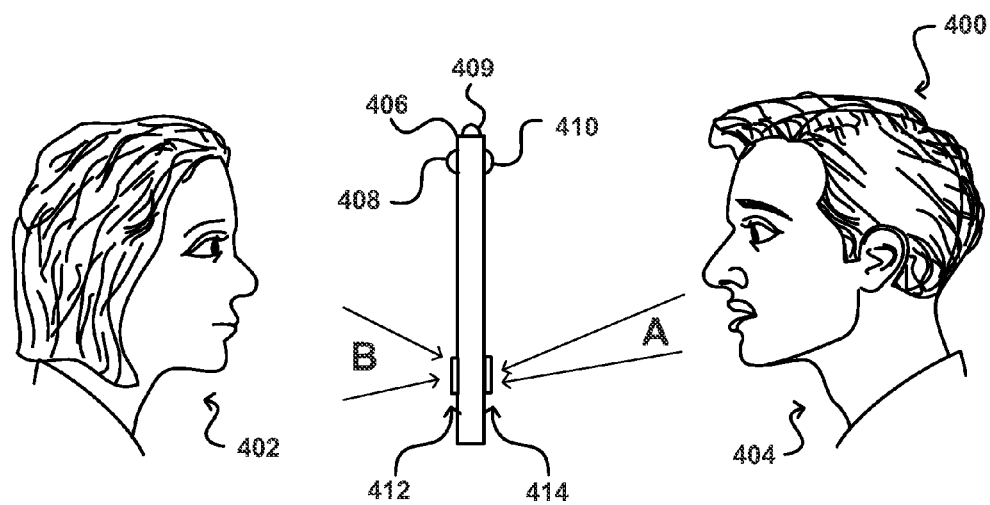
FIGS. 4(a), 4(b) and 4(c) illustrate examples of a computing device capturing image information and/or audio information corresponding to at least one source in accordance with various embodiments.
Figure 4B:
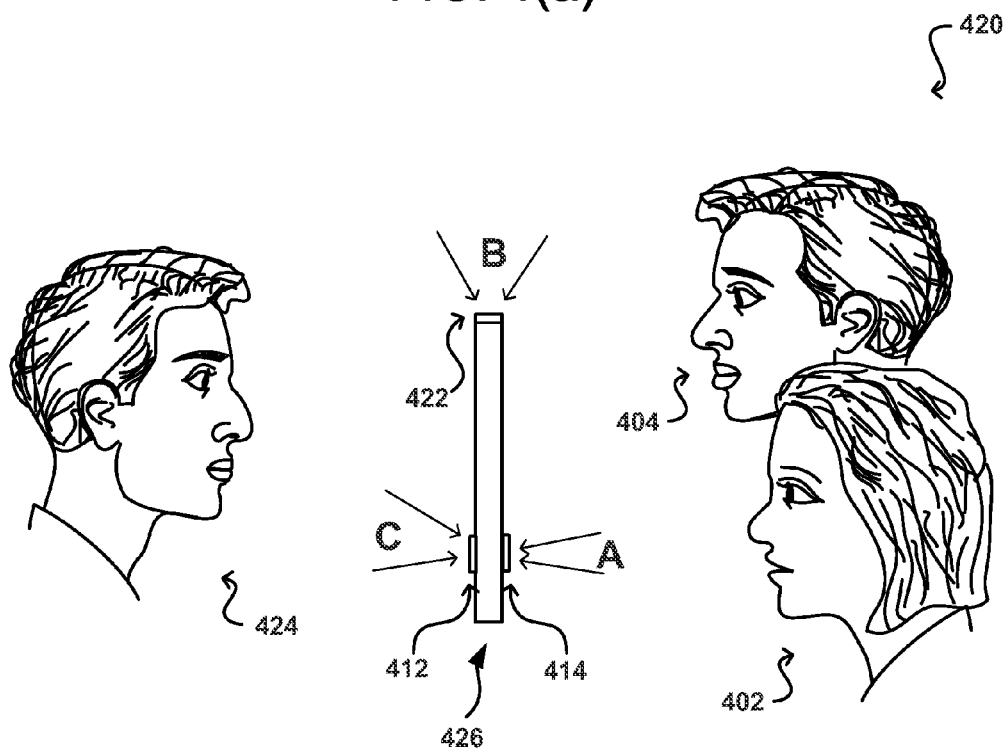
Figure 4C:
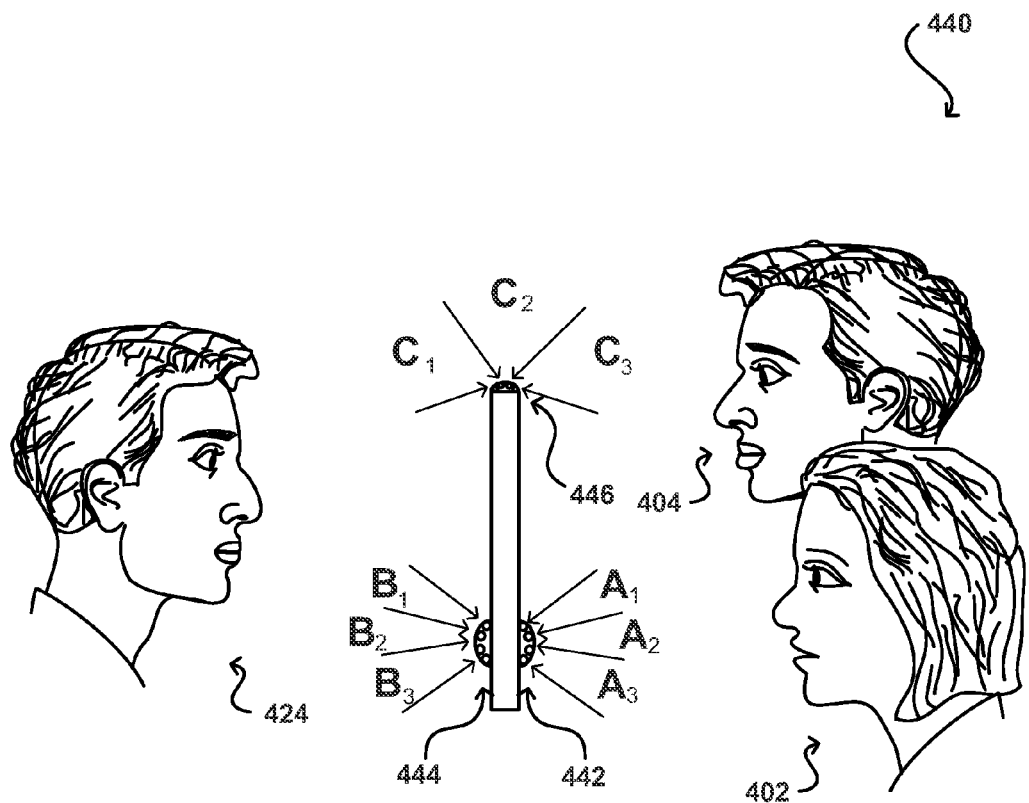

FIG. 4(*b*) illustrates a more complex example 420, wherein there are three users 402, 404, and 424 positioned about the device. In such a situation, two microphones may not be sufficient to provide adequate directionality for audio capture and/or projection. In this example, the device includes at least a third microphone 422 on an edge, side, or corner of the device. As discussed previously, the microphones can be positioned at locations distributed across the device 426 such that audio data can be collected in substantially any direction about the device. The device 426 can include at least two image capture elements (e.g., cameras with fisheye or other wide angle lenses as discussed above) to determine approximate relative positions of various persons or other audio sources, and determine which of these sources are generating audio that should be captured. In this example user 402 is determined to be moving her mouth from the image capture information, such that the device can determine microphone 414 (corresponding to direction range A) is best able to capture audio from that user based upon her relative position to the device. The audio captured by the other microphones then can be ignored or used to filter out sound from other directions (e.g., directions B and C). In this case, the device might subtract (e.g., filter out) weighted amounts of the audio captured from microphones 412 and 422, with different weightings for each. For example, the audio from direction range B captured by microphone 422 might be subtracted less than the audio from direction range C captured by microphone 412 since microphone 422 might be able to capture more audio from user 402, or at least less likely to include random other noise.

FIG. 4(*c*) illustrates an example situation 440 wherein each microphone 442, 444, 446 is separately capable of directional audio capture. While these microphones could include moveable portions or other such components to selectively capture audio from specific directions, in this example, each microphone includes a plurality of audio capture elements each configured to capture audio from a specific direction. Thus, microphone 442 might not capture information from all such elements based on the determination that user 402 is speaking, but might capture from only a portion of those elements, or capture by weighted amounts from different of those elements. For example, in FIG. 4(*c*) audio coming primarily from direction A3 might be determined to correspond most closely to the determined relative location of user 402, such that the device might only capture audio from that element. In another approach, the device might determine that sound captured by elements corresponding to direction A2 would most correspond to the relative position of user 402, and might use some weighted combination of these elements while filtering out the audio captured by all other elements corresponding to directions A1, B1, B2, B3, C1, C2 and C3 (by potentially similar or separately determined weightings as well). And as discussed, each microphone element can be monitored and adjusted dynamically as necessary, as may be based upon user or device movement, additional noise sources, etc.

Figure 5:
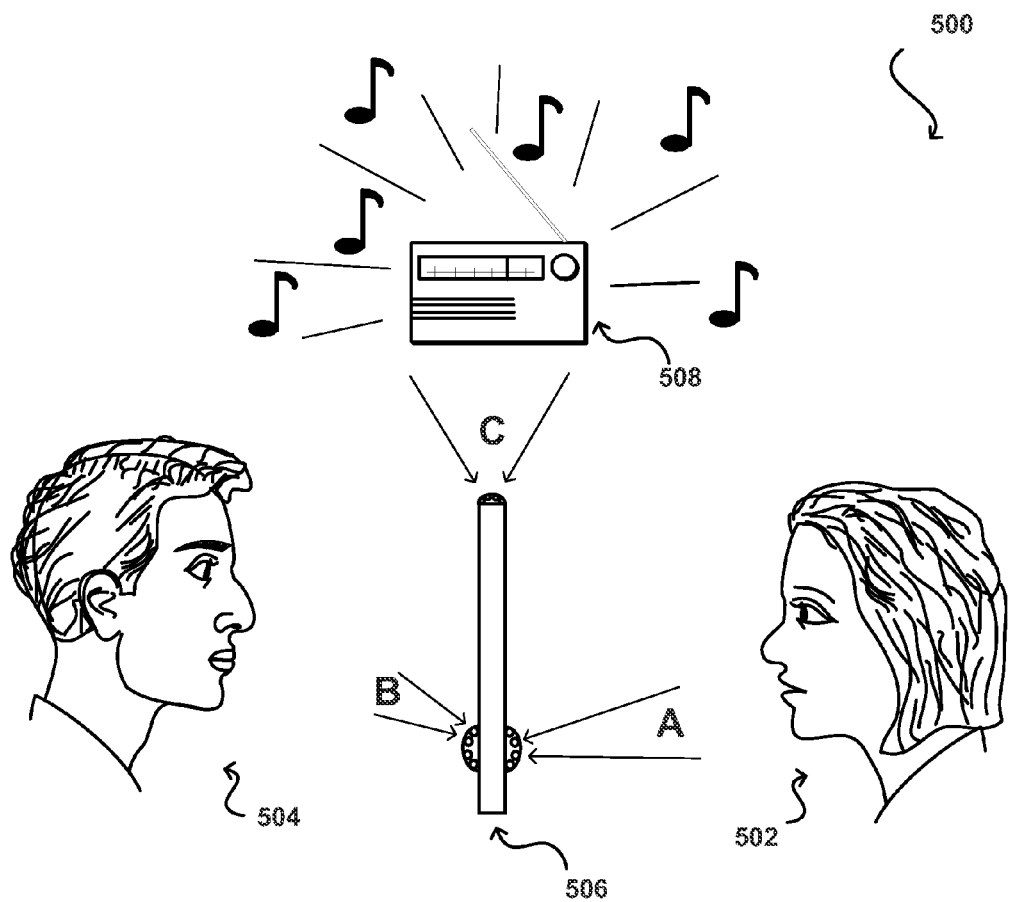
FIG. 5 illustrates an example of a computing device capturing image information and/or audio information corresponding to a specific location while minimizing audio captured from another location in accordance with various embodiments.

FIG. 5 illustrates an example case wherein, in addition to two users 502, 504 for which a device 506 might want to capture audio information, there is also a specific source of audio 508 for which the device wishes to exclude audio information. For example, in this example the device determines via image capture information that user 502 is speaking and the device 506 should try to capture audio information primarily from that relative direction. If the device detects a substantial amount of noise or audio interference from another direction, or otherwise determine a secondary audio source from which audio data is to be excluded, such as corresponds to the radio 508 in this example, the device might not only attempt to maximize the clarity of audio captured from the direction (e.g., A) of the active user 502 who is speaking or currently generating audio information, but might also want to specifically minimize sound originating from the direction of the radio (e.g., C). As discussed previously, the device can include one or more algorithms for more heavily weighting the filtering of audio information corresponding to the direction of the radio 508, in addition to filtering based upon the current direction for which audio is to be captured. In some embodiments, the device might want to capture audio for both users 502, 504 while filtering out the noise from the radio 508 or other such source as much as possible.

As illustrated in FIG. 5, the device might decide to capture audio from primarily the element corresponding most closely to the direction (A) of the user 502, while in other embodiments the device might decide to filter out audio from elements with direction (C) most closely corresponding to the direction of the radio 508. Various other combinations can be used as well, as indicated and as discussed elsewhere herein.

Figure 6:
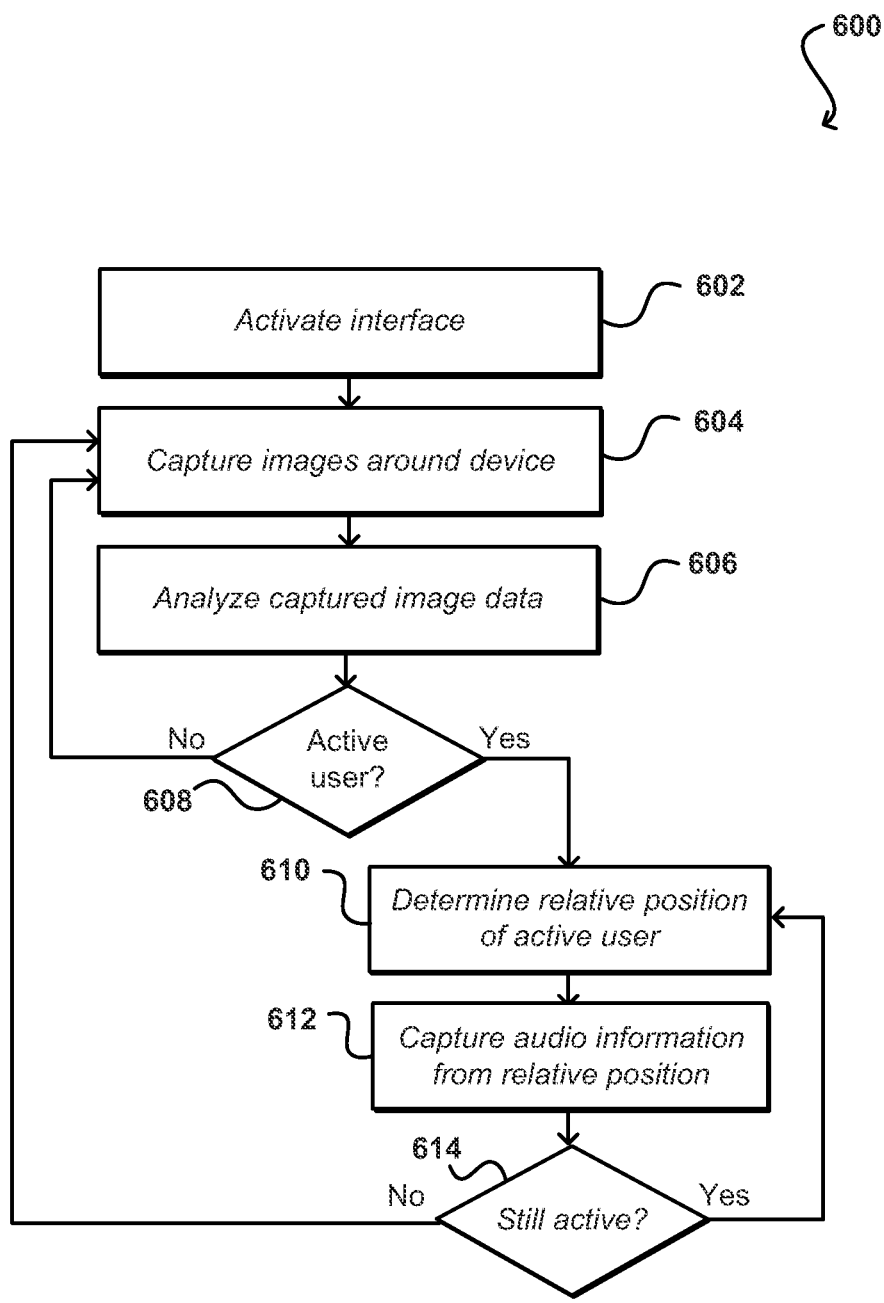
FIG. 6 is a flow diagram illustrating an example process for determining user input in accordance with one embodiment.

FIG. 6 illustrates an example process 600 for capturing audio from the direction/location of an active user (or other such source) using a device such as that described with respect to FIGS. 3(*a*)-3(*d*). In such a process, an interface on the device is activated 602, either automatically or manually, using any appropriate technique for activating or executing such an interface. At substantially the same time in this example, the device begins recording images (e.g., still or video) of areas around the device, at 604. As discussed, this can include images captured in certain directions or in substantially every direction around the device. In some embodiments, the device is in an "active listening" or similar mode, wherein the device does not attempt to analyze captured audio or video data unless the volume of the audio reaches a minimum level, a minimum amount of motion is detected in the captured video or some other such threshold is reached. In other embodiments, the device can continually, periodically or at any other appropriate times analyze the captured image data 606, such as to detect specific user motion or some other such motion, gesture, or action as discussed elsewhere herein. In some embodiments, video data is captured and/or analyzed only once sound of a minimum volume level is detected in order to reduce the drain on resources that would accompany capturing and analyzing video to assist with audio capture or filtering when no significant amount of audio is being produced near the device. In other embodiments, the video data is captured and analyzed once the sound of a defined or selected pitch, timbre or other criteria is detected.

As the image data is being analyzed, or after at least some initial analysis, a determination is made as to whether there is an active user for which audio should be captured 608. As discussed elsewhere herein, an "active user" (or other active source) is a user or source that is identified as being a target for audio and/or video capture, such as where a user is the nearest user, a selected user, a user that is recognized by the device, or another such user determined to be active by the computing device. In at least some embodiments, a user can be determined to be a selected user based upon detected actions in captured image information, such as the user moving lips to indicate speech or performing a specific gesture. If the computing device (or a system or service in communication with the device receiving the audio and/or video data) does not determine the presence of an active user or other such source near the device, the computing device can continue capturing images at the times discussed above to attempt to locate active users.

While image data is the primary source of information for use in identifying a relative direction/location of an active user, in some embodiments additional information can be used to supplement the image information. For example, in some embodiments, an initial algorithm can be used to analyze the audio data for at least one of a group or set of defined different triggers, such as a level of volume or the detection of frequency patterns that likely correspond to specific types of audio. A device can be configured to not analyze image or video information to locate the direction/position of a user until at least one audio trigger is detected, for example, in order to reduce the amount of unnecessary image analysis. In some devices, these types of determinations can be made at least partially through hardware, such that system memory and processing resources are not consumed analyzing the video until audio patterns exhibit at least one specified property. Image and/or video data captured by the device can be buffered for a short period of time such that recent image data (e.g., image captured over the last second) can be analyzed once a particular audio pattern is detected in order to avoid missing the first portion of the captured video, which might correspond to a portion of a motion or gesture, etc. In other embodiments, the image and/or video information are continually analyzed, at least while the device is in a certain mode or at a certain interface state, to detect any command or other such data. If image and/or video data captured by the device does not correspond to an active user (or other identified or authorized source as discussed elsewhere herein), the image and video data captured by the device can be ignored and/or discarded. In some cases, a device buffer will be a first-in-first-out (FIFO) buffer of a certain size such that the image and/or video data is routinely discarded after a period of time or as the buffer fills up unless that data is pulled from the buffer for analysis. Various other approaches to buffering, caching or otherwise temporarily storing content can be used as well within the scope of the various embodiments.

If an active user or other such source is determined, the computing device can determine the approximate relative position of that user or source with respect to the computing device, at 610. As discussed elsewhere herein, this can include any of a number of image analysis algorithms, and in some embodiments can be assisted by audio triangulation or any other such technique. When the relative position is determined, the device, at 612, can capture audio information from substantially the direction of the relative position, such as by utilizing only one or more microphones or other input devices that are substantially facing the direction of the active user or source, or within a given range of direction of the user or source. During the capture of the audio information for an active user, after the audio capture is completed, or at any other appropriate time, the computing device can analyze the captured image information (which in at least some embodiments would continue during audio capture) to determine if the previously-identified active user (or source) is still active 614. This could correspond to a user still speaking or performing a certain action or gesture, another device still being active, etc. If the user or source is still active, the device can continue to determine a relative location of the active user, in case the user or the computing device moves such that the relative position should be updated. If the user or source is not still active, the computing device can stop capturing audio data associated with that active user but can continue capturing and analyzing image data to attempt to locate active users or sources, which might be the same or another active user or source. In some embodiments, as discussed herein, there could be multiple active users and/or sources at any given time, and the computing device can be configured to detect, track, and concurrently capture audio for these multiple sources.

Figure 7:
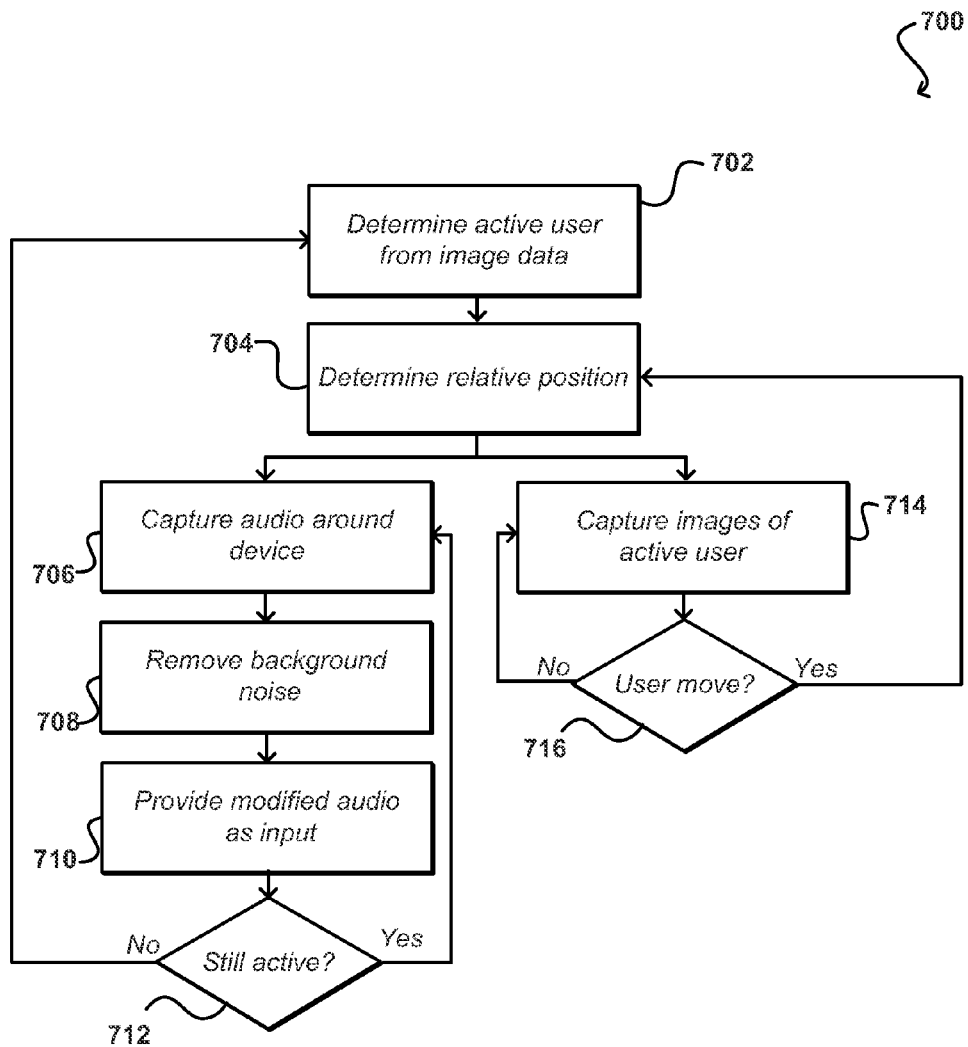
FIG. 7 is a flow diagram illustrating an example process for determining user input in accordance with one embodiment.

FIG. 7 illustrates an example process 700 for capturing audio from a particular active user (or other such source) such as discussed with respect to the process of FIG. 6. In this example process, the active user is determined from image data 702 and a current relative position of the active user is determined 704, as discussed above. In this example, once a relative position is determined for an active user, the computing device concurrently (or substantially concurrently) captures audio from at least the determined relative position of the active user 706, and image data of the active user 714. As discussed elsewhere herein, certain embodiments capture audio information only substantially in the direction of the active user, while in this embodiment the computing device also captures audio data from other directions in order to remove background noise and audio from other sources from the audio corresponding to the active user at the determined relative position, at 708. The noise to be removed from the captured audio can be any noise not emitted substantially from the determined relative location of the active user, from specific directions of other sources of audio data, or any other such approach discussed or suggested herein. Also as discussed elsewhere herein, the computing device can dynamically adjust the amount of data used for filtering/removal, the weights of audio from different directions, the type of filtering used, or other such aspects in order to attempt to improve the quality of the audio attributed to the active user. The modified audio (e.g., captured audio with background noise at last partially removed) then can be provided as audio input corresponding substantially to the relative position of the active user 710. During the capture of the audio information for an active user, after the audio capture is completed, or at any other appropriate time, the computing device can analyze the captured image information (which in at least some embodiments would continue during audio capture) to determine if the previously-identified active user (or source) is still active, at 712. This could correspond to a user still speaking or performing a certain action or gesture, another device still being active, etc.

While the audio is being captured and/or processed, the device can continue to capture images of the active user 714. In at least some embodiments, the computing device can determine whether the active user (or the computing device) moves by an amount such that the relative position should be updated 716. If not, the device can continue to capture images of the active user at the determined relative position. In some embodiments, the device will only capture images of the active user while the user is active, while in other embodiments the device will capture image data in other directions as well, such as to detect other active sources or other sources for which audio data can be filtered out, etc. If there is movement such that the relative position of the user should be updated, the computing device can again determine the relative position of the active user from the captured image data 704. As discussed elsewhere herein, in some instances the active user might not move but the computing device might be moved, tilted, or otherwise adjusted in position or orientation such that the relative position must be updated in order to capture audio from the current relative direction of the active user. For example, if the device is rotated 180 degrees then a completely different microphone or set of microphones of the computing device might be needed to capture audio from the active user.

Figure 8:
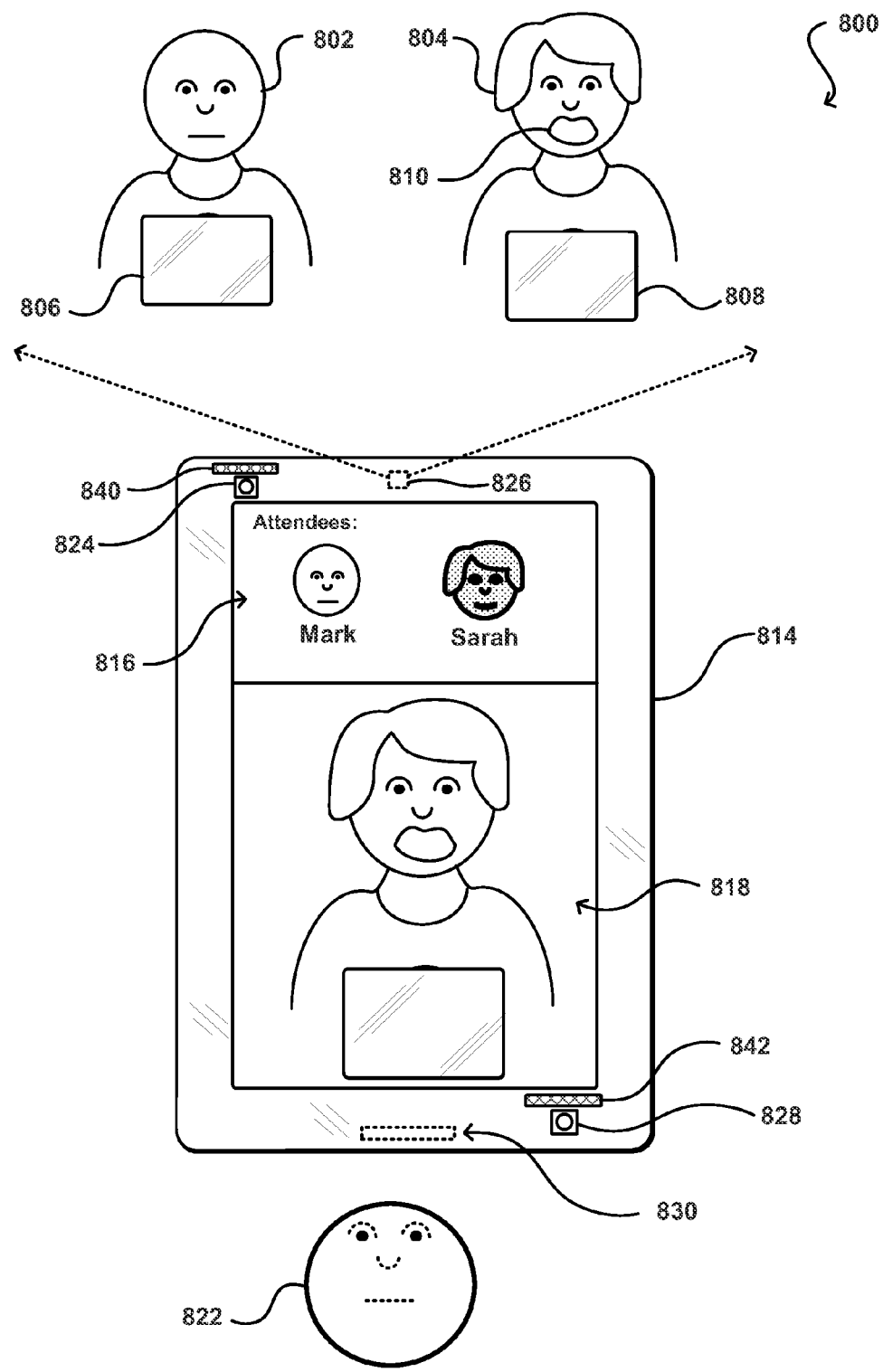
FIG. 8 illustrates an example situation wherein a computing device is able to determine who is speaking and capture audio and video of that user, in accordance with one embodiment.

FIG. 8 illustrates an example situation 800 wherein a computing device is not only able to determine an active speaker, in this case who is speaking, but also can identify and capture video of that active user. In one embodiment, computing device 814 includes at least one image capture element 826 positioned on the opposite side of the device from the display screen 818 such that the image capture element 826 captures image or video data of objects or persons on a side of the device substantially opposite to the relative position of a primary user 822 of the device. For example, if a user 822 is holding up the device 814 with the display screen 818 toward the user, image capture element or camera 824 could capture image information for the user of the device, and image capture element or camera 826 could capture image information for other persons in the general vicinity that are not on substantially the same side of the device as the user 822. In some embodiments, image capture element 826 can include at least one optical element, such as a wide-angle or fish eye lens, which enables image capture element 826 to capture images over a wide range of angles, such as 180 degrees or more. Further, each image capture element 824, 826 and 828 can comprise a digital still camera, configured to capture subsequent frames in rapid succession or a video camera capable of capturing continuous video.

This example computing device 814 also includes at least one microphone 830 on the same side of the device 814 as image capture element 826. While multiple microphones can be used as discussed elsewhere herein, at least a second microphone 830 on the side of the device 814 facing other users can increase the ability to pick up sound from persons on a side of the device 814 opposite the user 822. The second microphone 830 can be a wide angle microphone operable to capture audio from substantially any direction about the computing device 814, or can be a directional, multi-element, moveable, or other microphone as discussed elsewhere herein. Also, while the second microphone 830 is capturing audio from active user 804, for example, the audio captured from microphones 840 and 842 (as well as any other microphones) can be used to filter out audio captured from other directions. Similarly, when the primary user 822 is active the audio captured from the second microphone (and any other such audio capture element) 830 can be subtracted or otherwise removed from the audio captured by at least one directional microphone 840, 842 at least partially facing the primary user 822, such that sounds not corresponding to the direction of the user (e.g., background noise) can be filtered out from the audio before analysis. The device can also include one or more algorithms or mechanisms for recognizing and differentiating specific audio waveforms (e.g., speech or music) from other waveforms in order to help determine which portion(s) of the audio to analyze. It should be understood that different computing devices can include any appropriate number of image capture elements (e.g., one or more), any appropriate number of audio capture elements (e.g., one or more) and any appropriate number of audio and/or image analysis or filtering algorithms in accordance with various embodiments. In another example embodiment, secondary microphone 830 may include a plurality of microphones, and may be configured as an audio capture element array or beamformer. The array may also be used to provide improved spatial information about other signal sources located on a side of the device 814 opposite the primary user 822.

In many embodiments, the device may capture image information to attempt to determine at least one active user for which audio and/or video data should be captured. For instance, consider the example situation 800 of FIG. 8, wherein there are three people in a meeting, including the primary user 822 of a first computing device 814 (the "user device" in this example) and two other persons (here, Mark 802 and Sarah 804) each (potentially) with their own second device 806, 808, respectively. There also can be other users connected via a network connection who are able to view the captured video and listen to the captured audio on at least one remote device (not shown). The devices in this example can be the same or different types of devices with similar or different capabilities. The user device in this example has at least a first image capture element 824 able to capture images of the user 822 and at least a second image capture element 826 on the other side of the user device able to capture image data including images of Mark 802 and Sarah 804 located on the other side of the user device. During the meeting, the user device 814 may detect mouth movement from the user(s), Mark, and/or Sarah, either individually or at the same time. Thus, when the user device 814 detects an active user, the user device can determine the approximate relative location of that active user, and can cause audio and/or video information to be captured from substantially that direction. For example, the user device 814 may utilize one or more image algorithms to identify whether the user's, Mark's, or Sarah's, lips were moving at a particular time, such as substantially the same time as the audio was captured by at least one of microphones 830, 840, and 842 of the device 814.

In the example provided in FIG. 8, Sarah is speaking at this point during the meeting 812, and the user and Mark are listening to Sarah. Thus, the user device 814, utilizing captured image data, identifies that Sarah's mouth 810 is moving, which can correspond to an action that causes the user device 814 to designate Sarah as an active user. The captured image data also indicates that the primary user 822 and Mark 802 are not speaking at that time because their lips are not moving, or they were not performing another such action, such that these persons are not designated as active users at the current time. The user device 818 then can cause audio data to be captured for Sarah, or at least optimized to clarify audio coming from Sarah's position/direction. For example, the user device 814 could capture audio only from a microphone 830 most closely facing Sarah's direction, or could capture audio from multiple microphones corresponding to different directions, and could filter out audio attributed to other directions. Further, the device can in at least some embodiments focus video capture on the determined relative position of the active user. In this example, at least one video capture element of the user device 814 could be adjusted to capture video information of Sarah while Sarah is the active user, and potentially display this video on a display element 818 of the user device 814 and any other device (e.g., 806, 808, and any remote device) associated with the meeting. Using such an approach, each device can potentially broadcast video of the active user, as well as audio that is optimized to clarify speech or other audio data (e.g., humming, tapping, or singing) from the location of that user. In some embodiments, at least one algorithm can be used to filter out certain types of audio data even from the active user, such that if the user is tapping a pencil on a table while talking, the device can attempt to filter out the tapping noise and clarify the speech data. In this example, if Sarah is no longer the active user and Mark begins speaking or otherwise becomes the active user, the audio and video capture can shift to focus on the new relative position of the active user, now the position of Mark, such that video of Mark and audio optimized for Mark can be captured and/or broadcast.

In embodiments where the user device 814 has image recognition, or can obtain identifying information from at least one of the other devices 806, 808, the user device can also identify each user, as well as the current active user. For example, in FIG. 8 the device associates the audio data with Sarah 804 because Sarah's mouth 810 is moving and she has been designated as the active user. In at least some embodiments, the device can also determine the approximate relative position (or at least direction) of each person relative to the user device 814 using image analysis techniques, triangulation, or any other such process, and can display icons, images, avatars or other such graphical representations 816 for the detected persons in a way that corresponds to the relative position of the persons with respect to the user device (which can be useful in meetings, presentations or other such settings). In this example, when the device detects that Sarah is the active user, the device can change the graphical representation 816 corresponding to Sarah, such as by highlighting, changing the color, animating, or otherwise modifying the representation. Thus, a user attending the meeting remotely can obtain not only audio optimized for the current speaker, but can also obtain video of that active speaker, identification information of that speaker and others in attendance, and can view the relative position of all those people, as least those in the same room or general area.

In addition to determining when a user is moving his or her mouth, various other actions can be used to designate an active user in accordance with various embodiments. For example, FIG. 9(*a*) illustrates an example situation 900 wherein the user of the user device wants to designate Sarah as the active user, such as where it is Sarah's turn to speak, perform, or otherwise provide audio data. In some embodiments, the user can make a specific gesture, such as to point to Sarah's location or move the user's arm in Sarah's direction. Other similar motions can be used, such as "throwing" active status to Sarah or making any other such gesture or motion.

Figure 9A:
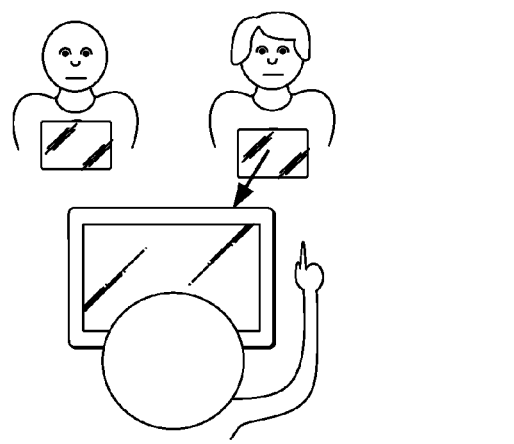
FIGS. 9(a), 9(b) and 9(c) illustrate examples of gestures that can be used along with image information to provide input to a computing device in accordance with one embodiment.
Figure 9B:
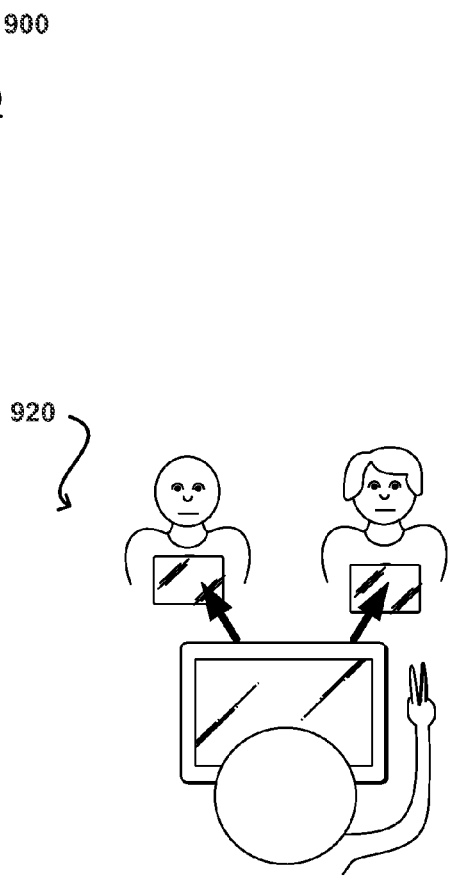
Figure 9C:
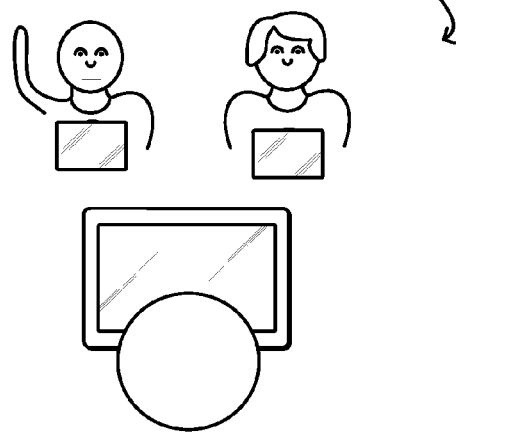

FIG. 9(*b*) illustrates another example situation 920, wherein the user wants to designate multiple persons as active users. The user may also use one or more gestures to designate users as being active, such as to point to each person individually, point to each person at the same time using different fingers, or to spread out all fingers as a gesture to "activate all." Other gestures or motions can be used as well, such as to make a sweeping motion across the device, which indicates to enable to all persons in that general area to be active. Such a motion can alternatively be used to designate an active "region." For example, the user might want to capture video of all persons on a stage, while filtering out audio data coming from other directions. Thus, instead of focusing on active users, such as by focusing on each actor as that user is speaking a line, the video can focus on the entire stage, and capturing audio from that general area instead of a specific relative position. Various other options and inputs can be used as well.

In some cases, at least some of the input can come from the other identified persons. For example, in the situation 940 of FIG. 9(*c*) Mark is holding up his hand to designate himself as an active user, such that the device can recognize, based on the one or more gestures of other inputs, to capture audio and/or video information for Mark. In some embodiments, various users can request active status, and the device can select one user at a time to receive active status and have audio and/or video information captured. In situations such as a presentation where different users might present different portions of the presentation, the device can pass "control" between specific persons. For example, a user might point to another person in order to pass control of the device. In some embodiments, the device can utilize image recognition or another such approach to ensure that the person providing commands to the device or receiving control of the device is authorized to do so. Such an approach can prevent other persons from inadvertently controlling the presentation and can minimize the work the device must do, as only commands presented by the person in control of the presentation will be processed. Further, when passing control of the device to a user located on a side of the device different from the current user in control, the device can activate, deactivate or change the roles of various input elements on the device, such as by turning on a camera on a first side of the device (corresponding to the person in control) and turning off a camera on the other side.

Figure 10:
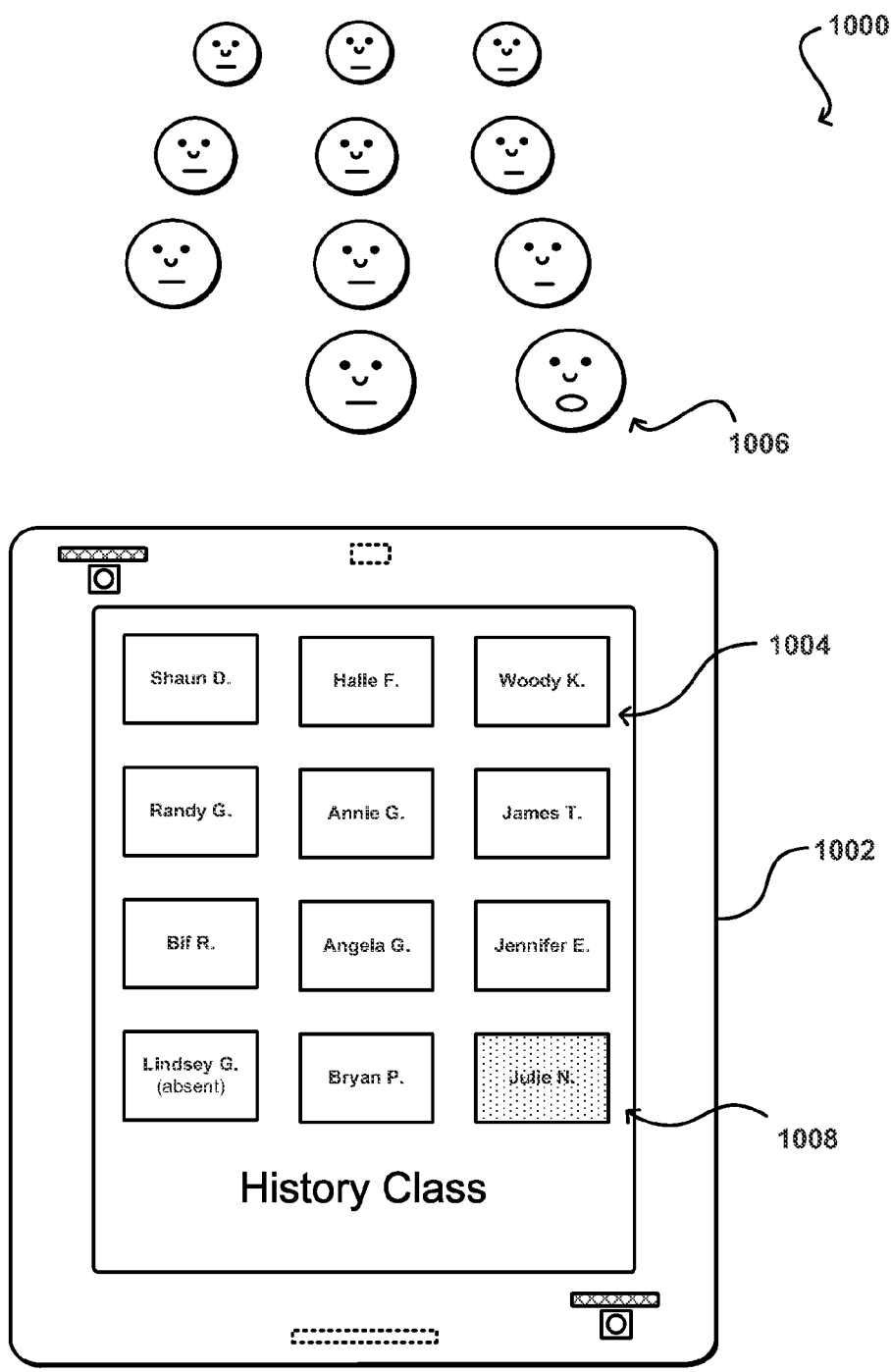
FIG. 10 illustrates an example situation wherein a computing device is able to determine who is speaking from a number of people in accordance with one embodiment.
Figure 11A:
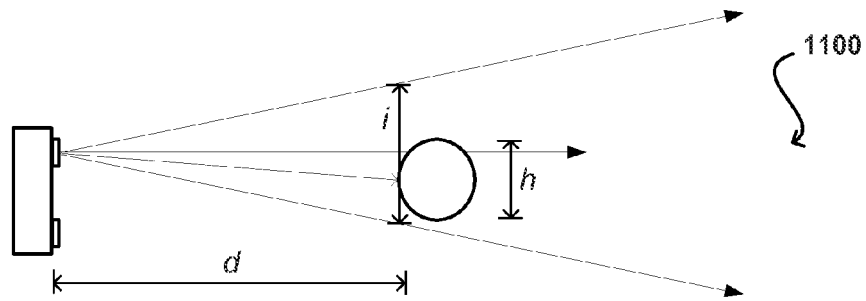
FIGS. 11(a), 11(b), 11(c), 11(d) and 11(e) illustrate example situations wherein a computing device is able to determine distance to an audio source in accordance with various embodiments.
Figure 11B:
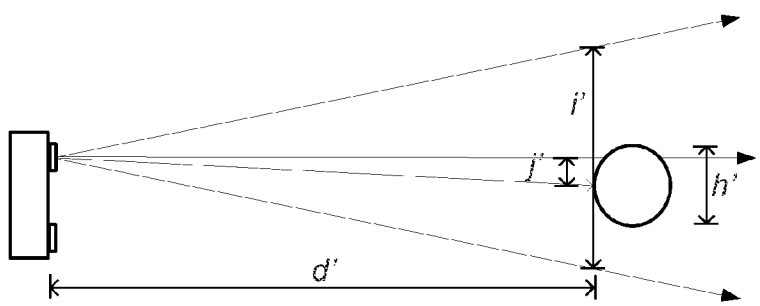
Figure 11C:
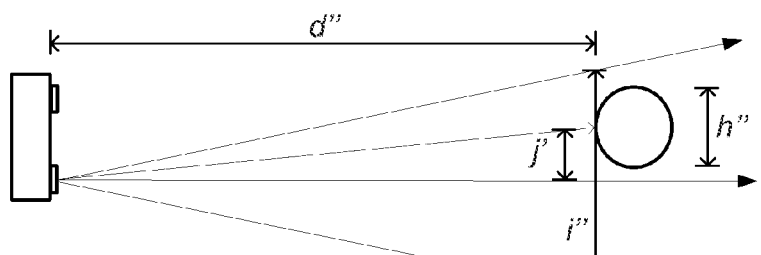
Figure 11D:
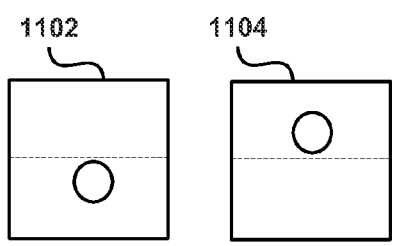
Figure 11E:
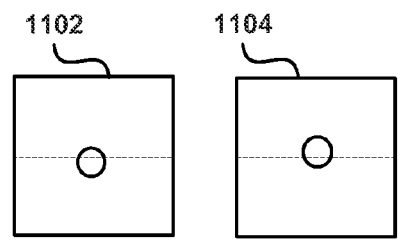

Approaches discussed herein can be used to perform any of a number of other tasks as well. For example, FIG. 10 illustrates an example situation 1000 where a computing device 1002 is used by a teacher in a classroom. A teacher's device can determine which student in the class is speaking, or making a gesture such as raising a hand. In this example, student Julie 1006 is providing the answer to the teacher's question, as determined by the movement of her mouth captured by the image capture element and/or the audio captured by the audio capture element. Such a device can be beneficial for situations where users are giving oral reports or answering quiz questions, as audio can be captured and attributed to specific students, and the captured audio can be optimized for the position of the speaking or other active student. For situations where the user is doing a presentation, the video also can be focused on the active student such that the teacher can later refer to the audio and video for each student. In situations where there is a substitute teacher, such an approach can enable the substitute teacher to know which student is which (e.g., labeled 1008 on device 1002), independent of what the students say, based upon factors such as facial recognition. Further, the performance of each student can be recorded and later analyzed by the permanent teacher. Such approaches can work in other situations as well, such as business meetings or brainstorming sessions. The device can include icons 1004 or other graphical elements corresponding to each person, as may be determined using image analysis, device detection, manual entry, or any other appropriate technique. Further, for classroom situations the device can use an appropriate algorithm to ensure that students are offered similar numbers of questions with similar levels of difficulty, such as by manipulating the display of an icon for a student to be asked the next question.

In some embodiments, such as where there might be only a single camera able to image a particular user, device, or other such object, it can be difficult to determine the distance to that object. While in some embodiments direction may be sufficient, other embodiments rely upon distance as well, and without knowing the exact size of an object it can be difficult for an image analysis to determine the relative distance to that object from a single image, or set of images taken from a single vantage point. Accordingly, it can be desirable in at least some embodiments to also determine the distance to an active user or other such object captured in the images. In some cases, a relative distance can be determined at least in part by determining the apparent size of an object in the image with the known size (or an approximate size) of the object. For example, as illustrated in the example 1100 of FIG. 11(*a*), the distance to an object with height (in the figure) h will affect how large the object appears in the image. At a first distance d, the image height (based on the field of view at a current level of zoom) will be a height i, and the relative size of the object in the image will be given by h/i, where in FIG. 11(*a*) the object takes up approximately 50% of the height of the image. As illustrated in FIG. 11(*b*), as the distance to the object increases to a distance d', the image height for the field of view at that distance is a larger height i', but the height of the object is the same. The apparent height of the object in the image will decrease, however, as the ratio of h/i now yields a value of approximately 30% of the overall height in the image. For objects with known height captured with a capture element with a known field of view, for example, an algorithm can determine an approximate distance to that object based on the relative size of the object in the image. In one example embodiment, the device can be calibrated by instructing the user to locate the device so that the user's head is a defined distance (e.g., 18") from the device and immediately in front of the device. Using this information in operation, the device can determine a distance between the user and the device based upon a ratio of the image size of the user at the current location and the size from the defined distance during calibration.

In many cases, however, the precise size of the object might not be known. For example, multiple users might utilize the device where each user can have features of different sizes. Further, users might alter their appearance, such as by changing a hair style, growing facial hair, or putting on weight, such that the calculation can be imprecise even for a known user.

Several embodiments discussed above capture images of a common object (e.g., a user) from multiple angles. Using parallax-type information, it is possible to get an improved measure of distance by utilizing a parallax analysis of the relative displacement or offset of the object between the images. For example, in FIG. 11(*b*) the distance from the center of the image to the center of the object (or a feature at the front center of the object) is given by a distance j. FIG. 11(*c*) shows the field of view for the second image capture element, separated a distance from the first image capture element. As can be seen, the distance from the center of the second image to the center of the object is a different distance, here a distance j'. As should be understood, the directions of the offsets can be the same or opposite in the images. The values of j and j' will necessarily increase with an increase in distance to the object. Thus, a determination of distance can be measured using the offset of a feature position in the two images. An advantage to such an approach is that the actual size of the feature does not matter as long as a consistent point is determined for the feature in each image that can be used to determine the offset.

In some cases, a combination of such approaches can be used to improve accuracy. For example, the information that can be obtained from an image can be limited to at least some extent by the resolution of the imaging element. Thus, combining distance measurement approaches in some embodiments can provide a more precise determination of distance. For example, FIG. 11(*d*) illustrates a first image 1102 and a second image 1104 of an object taken at a first distance, captured with respective first and second image capture elements. FIG. 11(*e*) illustrates the same first image 1102 and second image 1104 captured with the object at a second distance, greater than the first distance. As can be seen, the overall offset (the sum of j+j') of the object in FIG. 11(*d*) is greater than the overall offset (the sum of j+j') of the object in FIG. 11(*e*). Thus, through proper calibration and analysis the device can make a first determination of distance based on the relative offset, which changes in proportion to the distance to the object. Also as can be seen, the apparent size of the object changes between FIG. 11(*d*) and FIG. 11(*e*). In embodiments where the device tracks the object, changes in apparent size also can be indicative of distance to the object. In embodiments where a user is recognized, such as through facial recognition or another such process, the apparent size also can be used to determine an initial distance to the user captured in a first image or set of images. In some embodiments, both approaches can be used and the results combined, with or without any weighting. As should be apparent, embodiments can use one or both of these approaches, and/or can combine one or both of these approaches with at least one other measurement approach known for such purposes.

Not all computing devices contain two image capture elements or detectors (or other such devices) positioned a sufficient distance apart on a device to determine distance using parallax. Still other devices might not rely solely (or at all) upon parallax to determine distance to a user or other object of interest. Accordingly, certain devices can utilize other mechanisms (in addition or alternative to apparent size in captured images) to attempt to determine distance.

Figure 12:
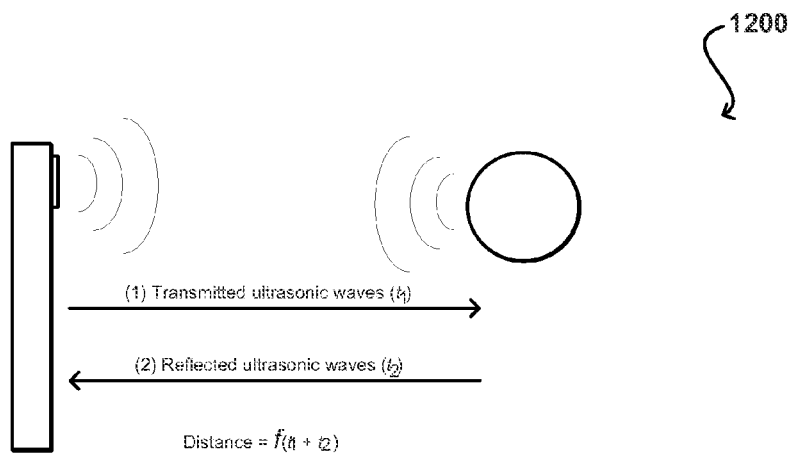
FIG. 12 illustrates an example situation wherein a computing device is able to determine distance to an audio source in accordance with various embodiments.

FIG. 12 illustrates an example configuration 1200 that can be used in accordance with at least one embodiment, wherein the device includes an ultrasonic transceiver (or other such element(s)) capable of emitting a sonic pulse and detecting the reflected sonic pulse. As known in the art, since the speed of sound in a standard atmosphere is known within a degree of certainty, the distance to an object can be determined by measuring the amount of time needed for the pulse to travel to the object, be reflected by the object, and travel back to the ultrasonic device. As illustrated in FIG. 12, if the time it takes for a transmitted ultrasonic wave to reach the face of a user is $t_1$, and the time it takes for the reflected ultrasonic wave to arrive back at the device is $t_2$, then the distance to the object can be determined as a function of the sum of those times, or $f(t_1+t_2)$. Approaches for determining distance based on the time of travel of a reflected wave are well known in the art and will not be discussed in detail herein.

Figure 13A:
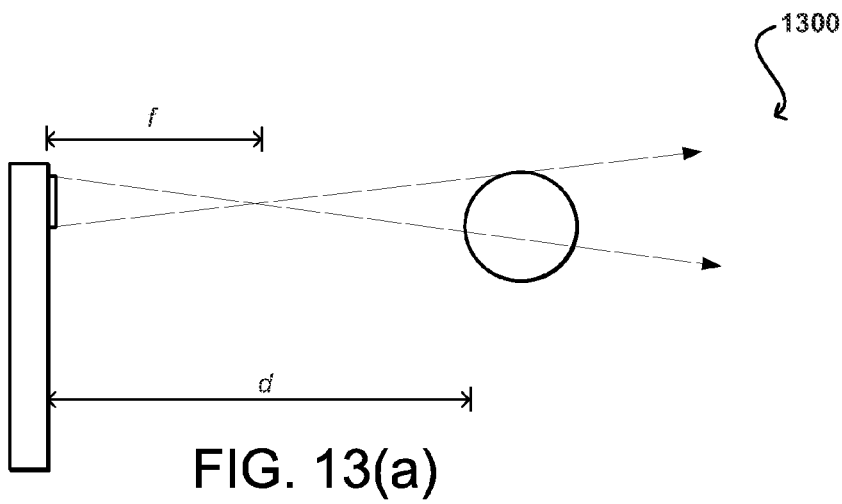
FIGS. 13(a) and 13(b) illustrate example situations wherein a computing device is able to determine distance to an audio source in accordance with various embodiments.
Figure 13B:
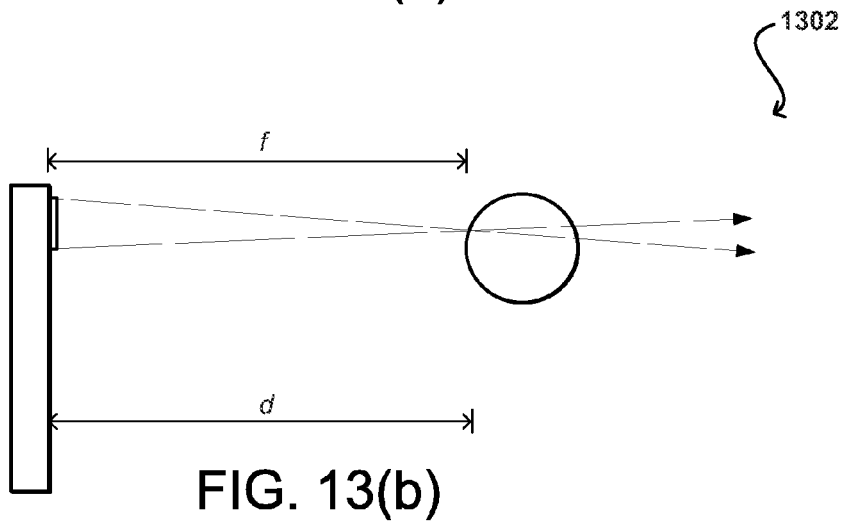

Such an approach still may not provide the desired level of precision in all cases, however, as there is a period of time needed for the ultrasonic wave to travel to the object and back, and any significant relative movement of the user (or other object of interest) during that time can affect the accuracy of the distance determination. FIGS. 13(a) and 13(b) illustrate an example approach that can be used in accordance with at least one other embodiment. The image capture components of certain computing devices can contain automated focusing optics which can adjust an effective focal length of the image capture component in order to focus on the object of interest. In the example configuration 1300 of FIG. 13(a), the effective focal length f is shown to be too short, such that an object at a distance d will likely not be in focus, or will be at least somewhat out of focus. In the configuration 1302 of FIG. 13(b), the optical elements have been adjusted such that the focal length f of the image capture element substantially equals the distance d to the object of interest, such that the object is substantially in focus. In addition to ensuring that the object is in focus, the adjustment in effective focal length also can provide a measure of the distance to the object of interest, as in this case f=d.

Thus, through careful calibration (and possibly periodic recalibration) of the imaging optics, an algorithm or process can determine the approximate distance to an object based at least in part on the effective focal length. An advantage to such an approach is that the determination of distance and the capture of an image can be substantially simultaneous, such that movement of the user will not significantly impact the measurements. In some embodiments the focus will automatically adjust and track the position of the user, such that the position will be substantially accurate as long as the user does not move faster than the focusing optics can adjust. In some embodiments, the device can determine when an image was captured while a user was moving or otherwise out of focus, and that image can be discarded and/or a new image captured when the user is back in focus. Other methods for tracking and determining accuracy can be used as well within the scope of the various embodiments.

A number of other approaches can be used as well within the scope of the various embodiments. For example, thermal imaging or another such approach could be used to attempt to determine and track the position of at least some aspect of a human user. In many instances the imaging system is desired to be small and cheap enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, can allow these relatively inexpensive cameras to be used as IR detectors.

Other conventional elements can be used to reduce the cost of a computing device able to perform approaches discussed herein, but might be less accurate and/or might require a larger device. For example, images can be split using beam splitters (e.g., silvered mirrors) such that half of the reflected light gets reflected to a different location (e.g., part of a sensor). Similarly, various optical elements such as an optical interferometer can be used to attempt to obtain accurate distance measurements.

As discussed with any optical approach, it can be desirable to perform at least an initial calibration procedure, as well as potentially additional and/or periodic recalibration. In one embodiment where two or more cameras are used, it can be advantageous to periodically capture images of a grid or similar pattern in order to calibrate for bends or physical changes in the optics. In some embodiments where an initial calibration is performed during the manufacturing process, the user might only need to have the device recalibrated when performance begins to degrade, or at any other appropriate time.

Figure 14:
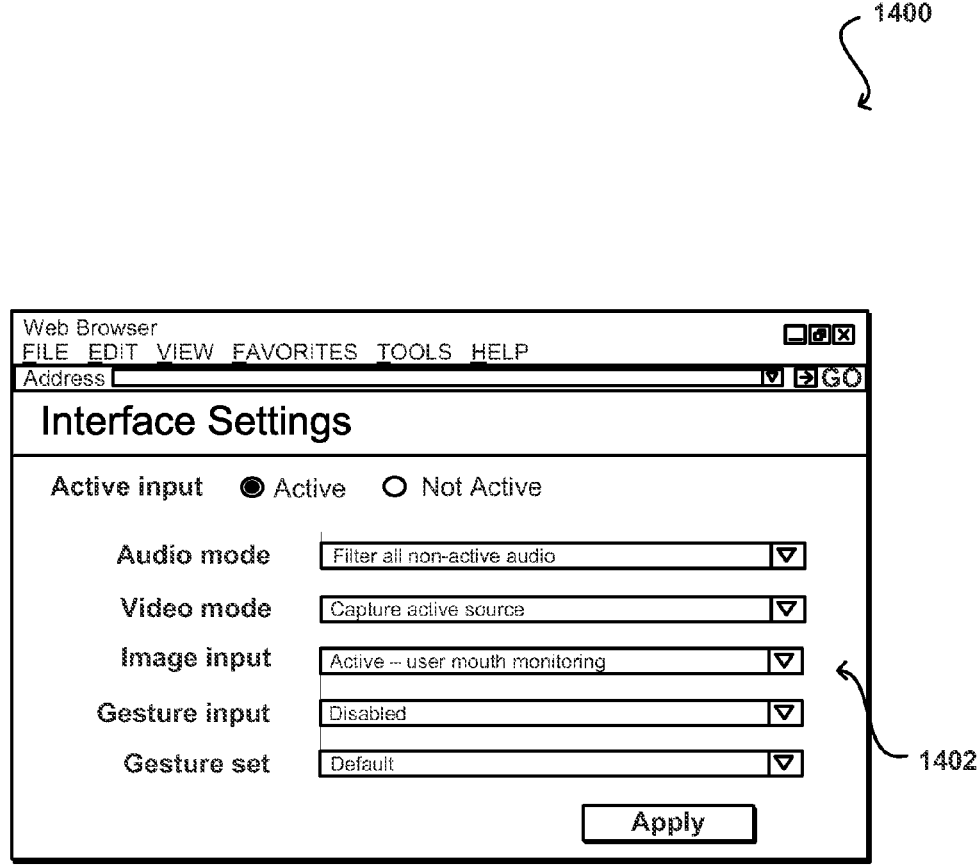
FIG. 14 illustrates an example configuration interface that can be used in accordance with one embodiment.

A user can enable and/or configure a variety of inputs and/or combinations to be used with a computing device in accordance with various embodiments. For example, FIG. 14 illustrates an example interface 1400 wherein a user is able to activate or deactivate "active" input, or input provided by audio and/or video data captured for a specific active source having a determined relative position. For active input, the user can specify options 1402 relating to the type of audio and/or video to be captured for an active source, as well as types of images to be used to designate active users (e.g., a user's mouth moving) and/or gesture input. The user can also have the opportunity to select from certain sets of options, such as specific gestures to be used to correspond to certain inputs, or can develop customized inputs. For example, if every time the user wants to designate active status the user points to a particular user, the device can be placed in a "learn" mode such that the gesture becomes associated with that command. At some point, the command can be provided with the gesture only, without also inputting a command to transfer active state, etc.

As mentioned above, various approaches can be used to attempt to conserve resources such as power consumption, particularly for portable or hand-held devices. For example, a video camera (typically very power intensive) might not be activated until one of a plurality of audio patterns is detected. In other embodiments, a low resolution image capture element might be used to determine when a user is making a gesture or performing an action, and a high resolution image capture element (or high resolution state of the same element) can be activated when needed for analysis. In some embodiments, an IR emitter and detector can be used to monitor the user's eyes or teeth (which will generally reflect IR) such that the device can detect when the user moves, or the user's lips begin to move, using the lower-power IR element(s) and then activate an ambient light camera in response to the detected lip movement. In some embodiments, a standard image capture element can be used to continually (or otherwise) capture image information, but would capture this information as compressed data and the device would only decompress and analyze the data when certain rules or criteria are satisfied, such as audio speech patterns being detected. In some embodiments, the camera could be turned on when a user reaches a certain interface or state and might be turned off after a period of inactivity while other mechanisms (e.g., audio) are used to monitor user input. In some situations, the camera can turn off after the user reaches a certain state or begins a particular activity, such as reading an electronic book on the device, except where voice control is used to flip pages or perform other such activities.

Figure 15:
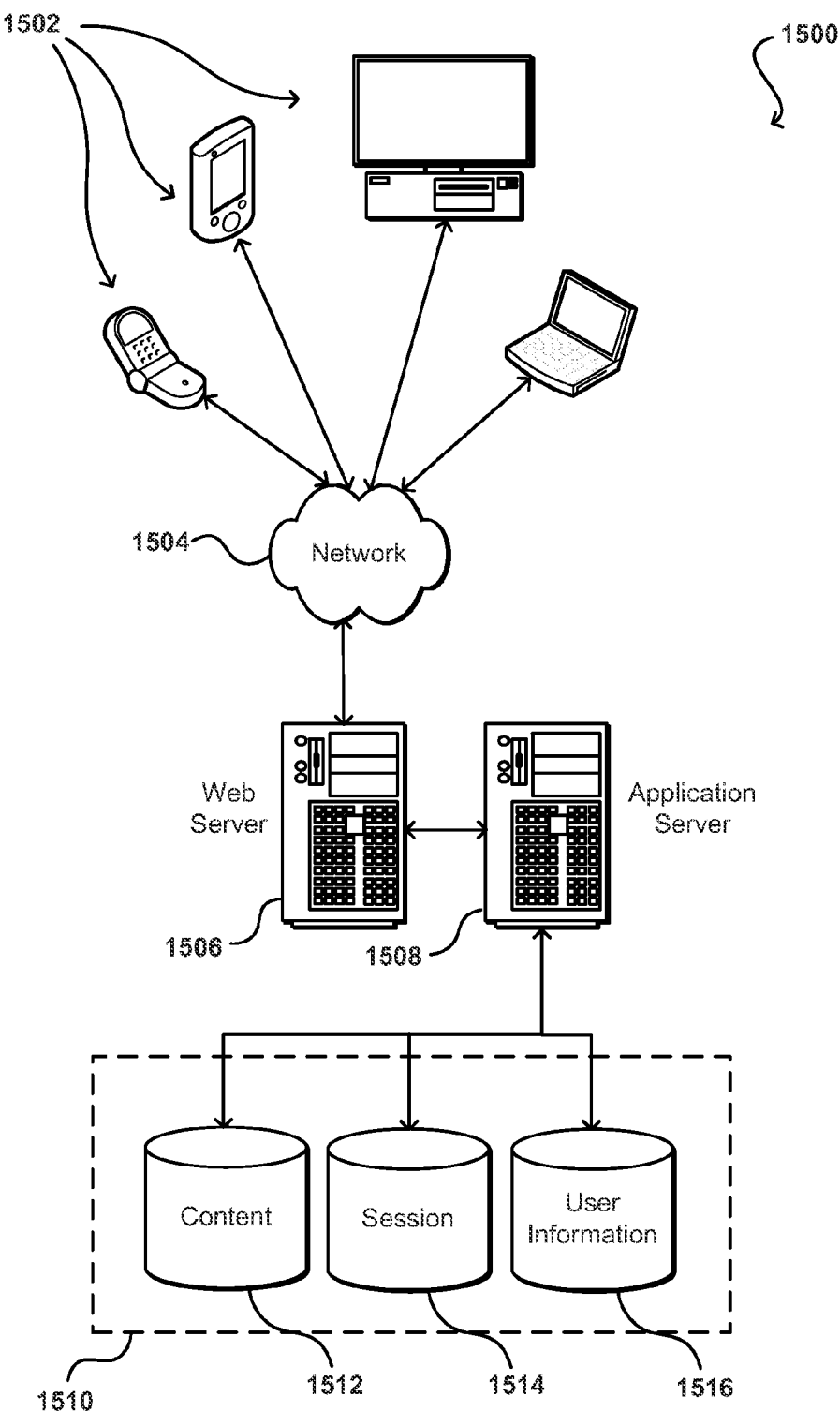
FIG. 15 illustrates an environment in which various embodiments can be implemented.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1506 for receiving requests and serving content in response thereto, although for other networks, an alternative device serving a similar purpose could be used, as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1506 in the form of HTML, XML or another appropriate structured language in this example. The handling of all requests and responses, as well as the delivery of content between the client device 1502 and the application server 1508, can be handled by the Web server 1506. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing content (e.g., production data) 1512 and user information 1516, which can be used to serve content for the production side. The data store is also shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of modifying user input to a computing device, comprising:
   capturing first image data of a user using a first image capture element of the computing device;
   capturing second image data of the user using a second image capture element, the first image capture element and the second image capture element being positioned on a same side of the computing device;
   analyzing the first image data and the second image data to detect at least one action performed by the user;
   determining, using a triangulation determination based at least in part on the first image data and the second image data, a relative position of the user with respect to the computing device;
   selecting, based at least in part on the relative position of the user, a first audio capture element from a plurality of audio capture elements, the first audio capture element being closer to the user than a remainder of the plurality of audio capture elements;
   capturing audio data using the plurality of audio capture elements of the computing device;
   determining background audio data included in the audio data based at least in part on the relative position of the user, the background audio data corresponding to sound captured by the remainder of the plurality of audio capture elements;
   generating modified audio data by removing data corresponding to at least a portion of the background audio data included in the audio data; and
   providing the modified audio data as input to the computing device.

2. The method of claim 1, further comprising:
   updating the relative position of the user based on the first image data and the second image data.

3. The method of claim 1, further comprising:
   capturing video data of the user using at least one of the first image capture element or the second image capture element, wherein the at least one of the first image capture element or the second image capture element is oriented to capture the video data from a viewable area at least partially including the relative position of the user.

4. The method of claim 1, wherein generating the modified audio data includes removing substantially all of the background audio data from the audio data.

5. A method of modifying input to a computing device, comprising:
   capturing first image data and second image data using at least two image capture elements of the computing device, the at least two image capture elements being positioned on a same side of the computing device, the first image data and the second image data including respective image representations of an active audio source;
   determining a relative position of the active audio source with respect to the computing device, based, at least in part, on a triangulation determination based at least in part on the first image data and the second image data;
   selecting, based at least in part on the relative position of the active audio source, a first audio capture element from a plurality of audio capture elements, the first audio capture element being closer to the active audio source than a remainder of the plurality of audio capture elements;

capturing active audio data using the plurality of audio capture elements;

updating the relative position of the active audio source based at least in part upon third image data of the active audio source captured using the at least two image capture elements to obtain an updated relative position of the active audio source;

adjusting the first audio capture element to capture the active audio data from a direction at least partially towards the updated relative position of the active audio source;

determining background audio data within the active audio data based at least in part on the updated relative position of the active audio source, the background audio data corresponding to sound emitted from locations other than the updated relative position of the active audio source; and modifying the active audio data to remove data corresponding to at least a portion of the background audio data.

6. The method of claim 5, further comprising:

analyzing the first image data to detect at least one action corresponding to the active audio source.

7. The method of claim 6, wherein analyzing the first image data comprises executing at least one image analysis algorithm for determining a motion of a user, a gesture of the user, speech formation by the user, or a state of a sound-producing device.

8. The method of claim 6, wherein determining the relative position of the active audio source with respect to the computing device further comprises:

validating an identity of the active audio source.

9. The method of claim 5, further comprising:

determining a second relative position of a secondary audio source with respect to the computing device;

capturing secondary audio data using at least one audio capture element of the computing device, the at least one audio capture element being configured to capture the secondary audio data from a direction at least partially towards the second relative position of the secondary audio source; and filtering the secondary audio data from the active audio data.

10. The method of claim 5, further comprising:

analyzing the active audio data and second audio data captured from any other audio source; and filtering of the active audio data based on the second audio data.

11. The method of claim 5, wherein capturing the active audio data is based at least in part upon an identity of the active audio source.

12. The method of claim 5, further comprising:

capturing video data of the active audio source using at least one image capture element of the computing device currently oriented to capture the video data from a viewable area at least partially including the relative position of the active audio source.

13. The method of claim 5, wherein the at least two image capture elements include at least one of an image capture element, an ultrasonic transceiver, an infrared transceiver, a laser, or a radio transceiver.

14. The method of claim 5, wherein the relative position of the active audio source is updated based upon at least one of movement of the active audio source or movement of the computing device.

15. The method of claim 5, wherein determining the relative position of the active audio source comprises identifying the active audio source within a defined area with respect to the computing device.

16. The method of claim 5, further comprising transmitting a response signal from the computing device in the direction at least partially towards the updated relative position of the active audio source.

17. The method of claim 5, wherein the active audio source is a primary user of the computing device or another person in closest proximity to the computing device.

18. The method of claim 5, further comprising:

determining a person speaking out of a plurality of people within a proximity of the computing device to be the active audio source.

19. A computing device, comprising:

a processor;

a memory device including instructions operable to be executed by the processor to perform a set of actions, enabling the processor to:

capture first image data and second image data using at least two image capture elements of the computing device, the at least two image capture elements being positioned on a same side of the computing device, the first image data and second image data including respective image representations of an active audio source;

determine a relative position of the active audio source with respect to the computing device, based, at least in part, on a triangulation determination based at least in part on the first image data and the second image data;

select, based at least in part on the relative position of the active audio source, a first audio capture element from a plurality of audio capture elements, the first audio capture element being closer to the active audio source than a remainder of the plurality of audio capture elements;

capture active audio data using the plurality of audio capture elements;

update the relative position of the active audio source based at least in part upon third image data of the active audio source captured using the at least two image capture elements to obtain an updated relative position; and adjust the first audio capture element to capture the active audio data from a direction at least partially towards the updated relative position of the active audio source;

determine background audio data within the active audio data based at least in part on the updated relative position of the active audio source, the background audio data corresponding to sound emitted from locations other than the updated relative position of the active audio source; and modify the active audio data to remove data corresponding to at least a portion of the background audio data.

20. The computing device of claim 19, wherein the instructions when executed further cause the computing device to:

analyze the first image data to detect at least one action corresponding to the active audio source.

21. The computing device of claim 19, wherein the instructions when executed further cause the computing device to:

determine a second relative position of a secondary audio source with respect to the computing device;

capture secondary audio data using at least one audio capture element of the computing device, the at least one audio capture element being configured to capture the secondary audio data from a direction at least partially towards the second relative position of the secondary audio source; and filter the secondary audio data from the active audio data.

22. The computing device of claim 19, wherein capturing the active audio data is based at least in part upon an identity of the active audio source.

23. The computing device of claim 19, wherein the instructions when executed further cause the computing device to:
capture video data of the active audio source using at least one image capture element of the computing device oriented to capture the video data from a viewable area at least partially including the updated relative position of the active audio source.

24. A non-transitory computer-readable storage medium storing processor-executable instructions for controlling a computing device, comprising:
program code for capturing first image data and second image data using at least two image capture elements of the computing device, the at least two image capture elements being positioned on a same side of the computing device, the first image data and the second image data including respective image representations of an active audio source;
program code for determining a relative position of the active audio source with respect to the computing device based, at least in part, on a triangulation determination based at least in part on the first image data and the second image data;
program code for selecting, based at least in part on the relative position of the active audio source, a first audio capture element from a plurality of audio capture elements, the first audio capture element being closer to the active audio source than a remainder of the plurality of audio capture elements;
program code for capturing active audio data using the first audio capture element and the remainder of the plurality of audio capture elements of the computing device;
program code for updating the relative position of the active audio source based at least in part upon third image data of the active audio source captured using the at least two image capture elements to obtain an updated relative position; and
program code for adjusting the first audio capture element to capture the active audio data from a direction at least partially towards the updated relative position of the active audio source with respect to the computing device;
program code for determining background audio data within the active audio data based at least in part on the updated relative position of the active audio source, the background audio data corresponding to sound emitted from locations other than the updated relative position of the active audio source; and
program code for modifying the active audio data to remove data corresponding to at least a portion of the background audio data.

25. The non-transitory computer-readable storage medium of claim 24, further comprising:
program code for analyzing the first image data to detect at least one action corresponding to the active audio source.

26. The non-transitory computer-readable storage medium of claim 24, further comprising:
program code for determining a second relative position of a secondary audio source with respect to the computing device;
program code for capturing secondary audio data using at least one audio capture element of the computing device, the at least one audio capture element being configured to capture the secondary audio data from a direction at least partially towards the second relative position of the secondary audio source; and
program code for filtering the secondary audio data from the active audio data.

27. The non-transitory computer-readable storage medium of claim 24, wherein capturing the active audio data is based at least in part upon an identity of the active audio source.

28. The non-transitory computer-readable storage medium of claim 24, further comprising:
program code for capturing video data of the active audio source using at least one image capture element of the computing device oriented to capture the video data from a viewable area at least partially including the relative position of the active audio source.

29. The method of claim 1, wherein the triangulation determination of the first image data and the second image data is based at least in part on angles associated with respective positions of the first image capture element and the second image capture element relative to the user.

* * * * *